United States Patent
Kato

(10) Patent No.: US 8,213,068 B1
(45) Date of Patent: Jul. 3, 2012

(54) SCANNING OPTICAL APPARATUS

(75) Inventor: Manabu Kato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 295 days.

(21) Appl. No.: 08/951,635

(22) Filed: Oct. 17, 1997

Related U.S. Application Data

(63) Continuation of application No. 08/607,169, filed on Feb. 26, 1996, now abandoned, which is a continuation-in-part of application No. 08/522,118, filed on Aug. 31, 1995, now Pat. No. 5,818,505.

(30) Foreign Application Priority Data

| Sep. 6, 1994 | (JP) | ........................................ 6-239386 |
| Feb. 28, 1995 | (JP) | ........................................ 7-066991 |
| Feb. 8, 1996 | (JP) | ........................................ 8-046741 |

(51) Int. Cl.
G02B 26/08 (2006.01)

(52) U.S. Cl. ............... 359/207.5; 359/204.1; 359/207.1; 359/207.3

(58) Field of Classification Search .......... 359/204–207, 359/217, 662, 216–219, 207.1–207.6; 347/241, 347/243, 244, 233, 258–261; 358/480, 481, 358/509, 510

See application file for complete search history.

(56) References Cited

U.S. PATENT DOCUMENTS

| 4,253,102 | A | 2/1981 | Kataoka et al. ............... 347/234 |
| 4,352,541 | A | 10/1982 | Minoura et al. |
| 4,561,717 | A | 12/1985 | Kataoka et al. |
| 4,585,296 | A | 4/1986 | Minoura et al. |
| 4,695,132 | A | 9/1987 | Sakuma ........................ 350/409 |
| 4,731,623 | A | 3/1988 | Oda et al. |
| 4,796,961 | A * | 1/1989 | Yamada et al. ............... 359/204 |
| 4,796,964 | A * | 1/1989 | Connell et al. ............... 359/204 |
| 4,799,747 | A | 1/1989 | Yamakawa ..................... 350/6.8 |
| 4,847,644 | A | 7/1989 | Oda et al. |
| 4,866,459 | A | 9/1989 | Tokita et al. |

(Continued)

FOREIGN PATENT DOCUMENTS

EP 0 291 313 11/1988

(Continued)

OTHER PUBLICATIONS

Aug. 8, 2005 Search Report in EP 01204171.

(Continued)

Primary Examiner — James Phan
(74) Attorney, Agent, or Firm — Fitzpatrick, Cella, Harper & Scinto

(57) ABSTRACT

A scanning optical apparatus includes a light source, a deflecting element for deflecting a beam of light emitted from the light source, an optical device for causing the beam of light emitted from the light source to be imaged into a linear shape long in the main scanning direction on the deflecting surface of the deflecting element. The optical device is comprised of a first optical element and a second optical element, and a third optical element for causing the beam of light deflected by the deflecting element to be imaged into a spot-like shape on a surface to be scanned. The third optical element includes a single lens, the opposite lens surfaces of which both include a toric surface of an aspherical surface shape in the main scanning plane, the curvatures of the opposite lens surfaces in the sub scanning plane being continuously varied from the on-axis toward the off-axis in the effective portion of the lens.

29 Claims, 31 Drawing Sheets

U.S. PATENT DOCUMENTS

| | | | |
|---|---|---|---|
| 4,934,772 A | 6/1990 | Sakuma et al. | |
| 4,955,682 A | 9/1990 | Yamaguchi et al. | |
| 4,971,411 A | 11/1990 | Takanashi | 359/206 |
| 5,005,928 A | 4/1991 | Suzuki et al. | 359/206 |
| 5,008,686 A | 4/1991 | Saito | 346/108 |
| 5,025,268 A * | 6/1991 | Arimoto et al. | 347/259 |
| 5,038,156 A | 8/1991 | Kuroda | 347/259 |
| 5,111,219 A | 5/1992 | Makino | |
| 5,128,795 A | 7/1992 | Endou et al. | 359/207 |
| 5,179,465 A | 1/1993 | Kondo | 359/218 |
| 5,200,850 A | 4/1993 | Iizuka et al. | 359/206 |
| 5,329,399 A | 7/1994 | Ho | 359/662 |
| 5,343,325 A | 8/1994 | Yamakawa | 359/205 |
| 5,411,430 A | 5/1995 | Nishimura et al. | 451/1 |
| 5,416,505 A * | 5/1995 | Eguchi et al. | 347/244 |
| 5,418,639 A | 5/1995 | Yamazaki | 359/216 |
| 5,432,535 A | 7/1995 | Andrews et al. | |
| 5,453,870 A | 9/1995 | Iima | 359/662 |
| 5,488,502 A * | 1/1996 | Saito | 359/205 |
| 5,557,446 A | 9/1996 | Kato | 359/206 |
| 5,563,729 A | 10/1996 | Nakamura et al. | 359/205 |
| 5,600,476 A | 2/1997 | Takada et al. | 359/206 |
| 5,648,865 A | 7/1997 | Iizuka | 359/208 |
| 5,652,611 A | 7/1997 | Nakashima et al. | 347/206 |
| 5,781,323 A | 7/1998 | Takada et al. | 359/206 |
| 5,818,505 A | 10/1998 | Kato | 347/258 |
| 5,883,732 A | 3/1999 | Takada et al. | 359/207 |
| 5,963,356 A | 10/1999 | Kato | 359/216 |
| 6,757,004 B2 * | 6/2004 | Kato | 347/244 |

FOREIGN PATENT DOCUMENTS

| | | |
|---|---|---|
| EP | 0 328 915 | 8/1989 |
| EP | 0 441 350 A2 | 8/1991 |
| EP | 441350 | 8/1991 |
| EP | 461660 | 12/1991 |
| EP | 0507344 | 10/1992 |
| EP | 0 559 423 A1 | 9/1993 |
| EP | 559423 | 9/1993 |
| JP | 51-100742 | 9/1976 |
| JP | 60-33019 | 7/1985 |
| JP | 61-48684 | 10/1986 |
| JP | 62139520 | 6/1987 |
| JP | 62-255915 | 11/1987 |
| JP | 63-157122 | 6/1988 |
| JP | 02-039120 | 2/1990 |
| JP | 2-46418 | 2/1990 |
| JP | 02-046418 | 2/1990 |
| JP | 02-054211 | 2/1990 |
| JP | 2-254211 | 2/1990 |
| JP | 2-109011 | 4/1990 |
| JP | 2-109012 | 4/1990 |
| JP | 2-20986 B2 | 5/1990 |
| JP | 2-220986 | 5/1990 |
| JP | 02-221910 | 9/1990 |
| JP | 03-033712 | 2/1991 |
| JP | 4-50908 | 2/1992 |
| JP | 4-104213 | 4/1992 |
| JP | 4-41807 | 7/1992 |
| JP | 4-41807 B2 | 7/1992 |
| JP | 05-346549 | 12/1993 |
| JP | 06-027404 | 2/1994 |
| JP | 6-34900 | 2/1994 |
| JP | 6-222296 A | 8/1994 |
| JP | 06-230308 | 8/1994 |
| JP | 06-265807 | 9/1994 |
| JP | 06-289287 | 10/1994 |
| JP | 7-13092 | 1/1995 |
| JP | 07-306371 | 11/1995 |
| JP | 8-76011 | 3/1996 |
| JP | 8-297256 | 11/1996 |
| JP | 09-033850 | 2/1997 |

OTHER PUBLICATIONS

Patent Abstracts of Japan, vol. 018, No. 670 (P-1845), Dec. 16, 1994 (JP 6-265807, Sep. 22, 1994).

Patent Abstracts of Japan, vol. 018, No. 241 (P-1733), May 9, 1994 (JP 6-27404, Feb. 4, 1994).

Dec. 26, 2006 Japanese Official Action in Japanese Patent Appln. No. 2005-172686 (with English-language partial translation).

Apr. 1, 2010 European Search Report in European Patent Appln. No. 10152653.1.

Mar. 16, 2011 European Communication in European Patent Appln. No. 10152653.1.

* cited by examiner

MAIN SCANNING SECTION

SUB SCANNING SECTION (1) ON-AXIS BEAM (2) MOST OFF-AXIS BEAM

MAIN SCANNING SECTION

MAIN SCANNING SECTION

SUB SCANNING SECTION (1) ON-AXIS BEAM (2) MOST OFF-AXIS BEAM

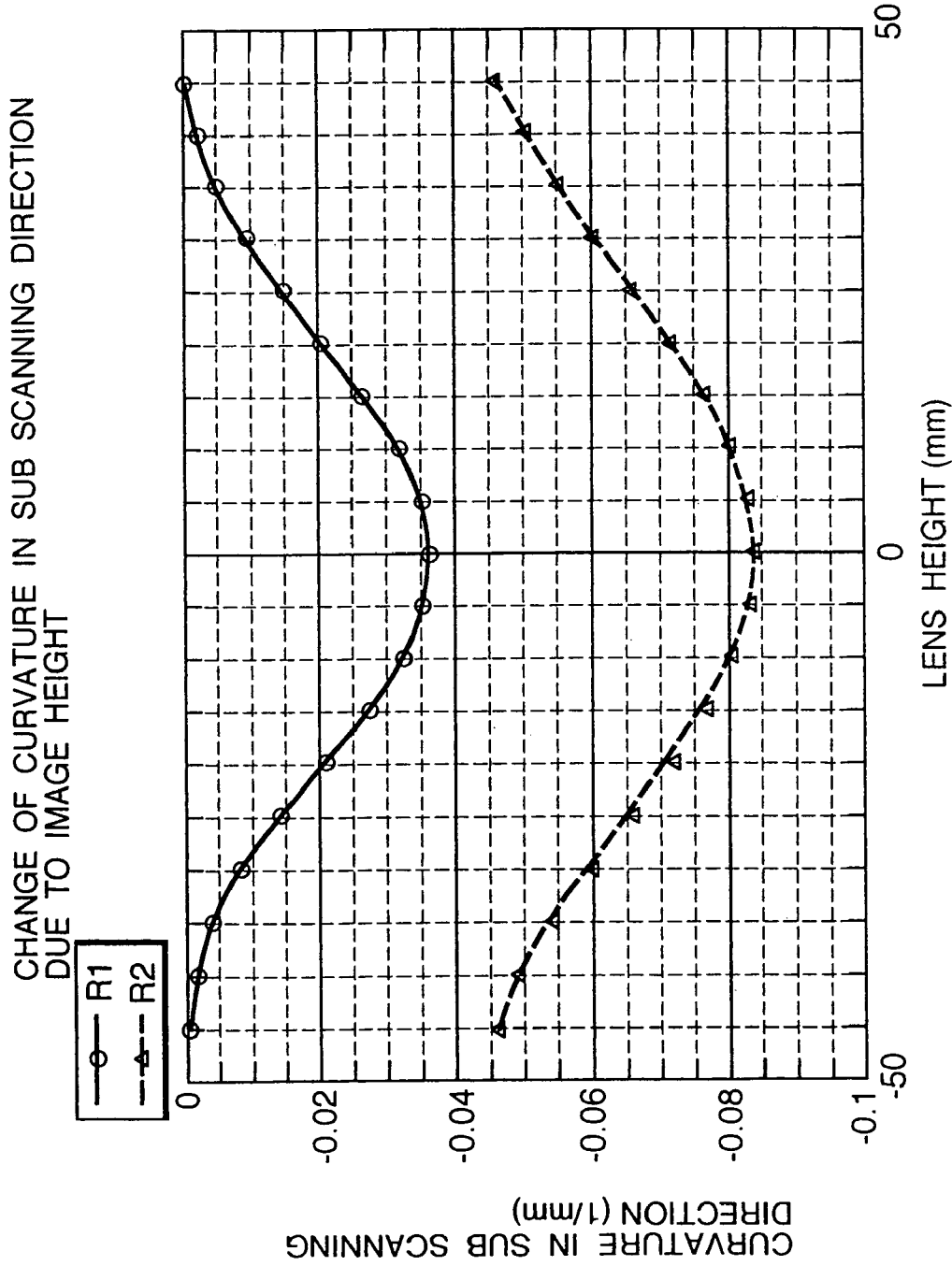

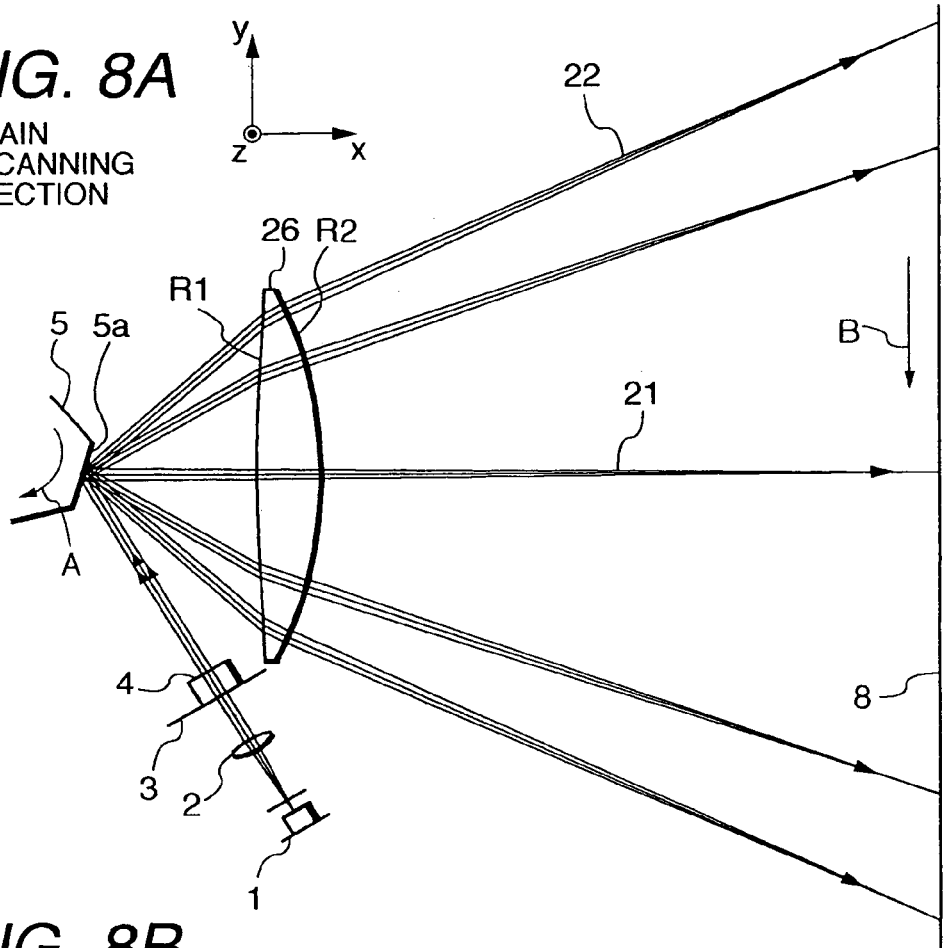
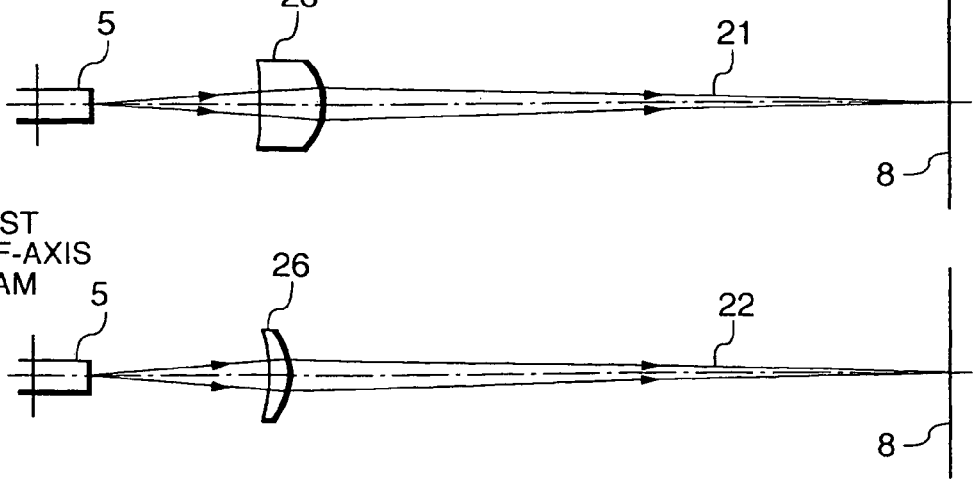

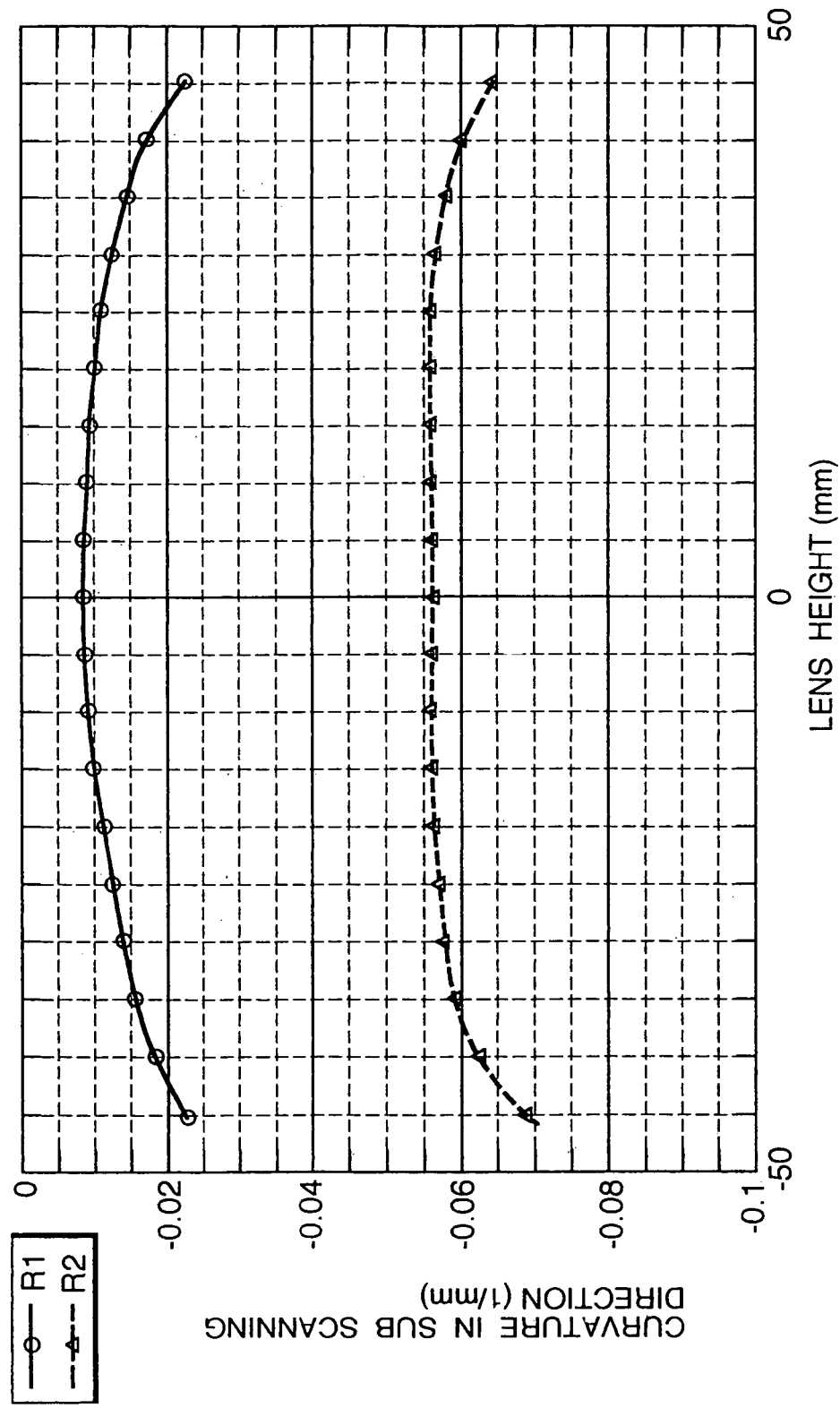

MAIN SCANNING SECTION

SUB SCANNING SECTION (1) ON-AXIS BEAM (2) MOST OFF-AXIS BEAM

MAIN SCANNING SECTION

SUB SCANNING SECTION (1) ON-AXIS BEAM (2) MOST OFF-AXIS BEAM

MAIN SCANNING SECTION

SUB SCANNING SECTION (1) ON-AXIS BEAM (2) MOST OFF-AXIS BEAM

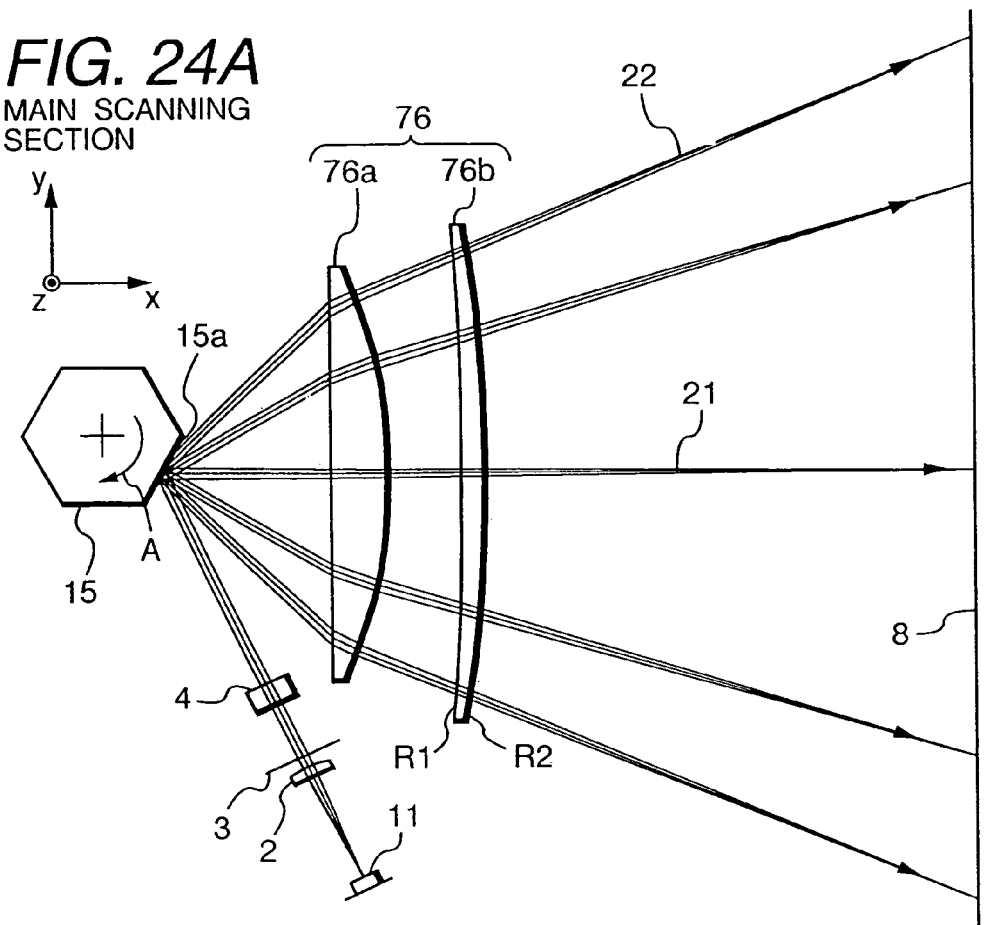
FIG. 24A
MAIN SCANNING SECTION
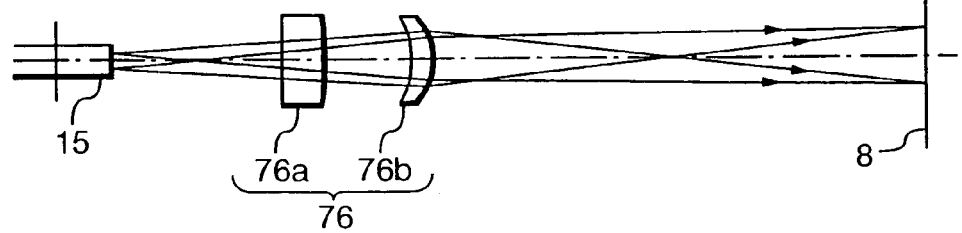
FIG. 24B
SUB SCANNING SECTION
(1) ON-AXIS BEAM
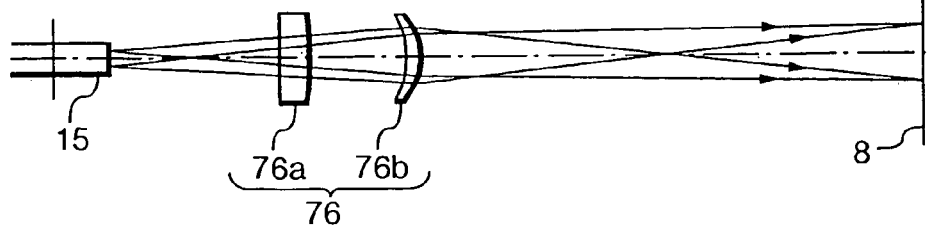
(2) MOST OFF-AXIS BEAM

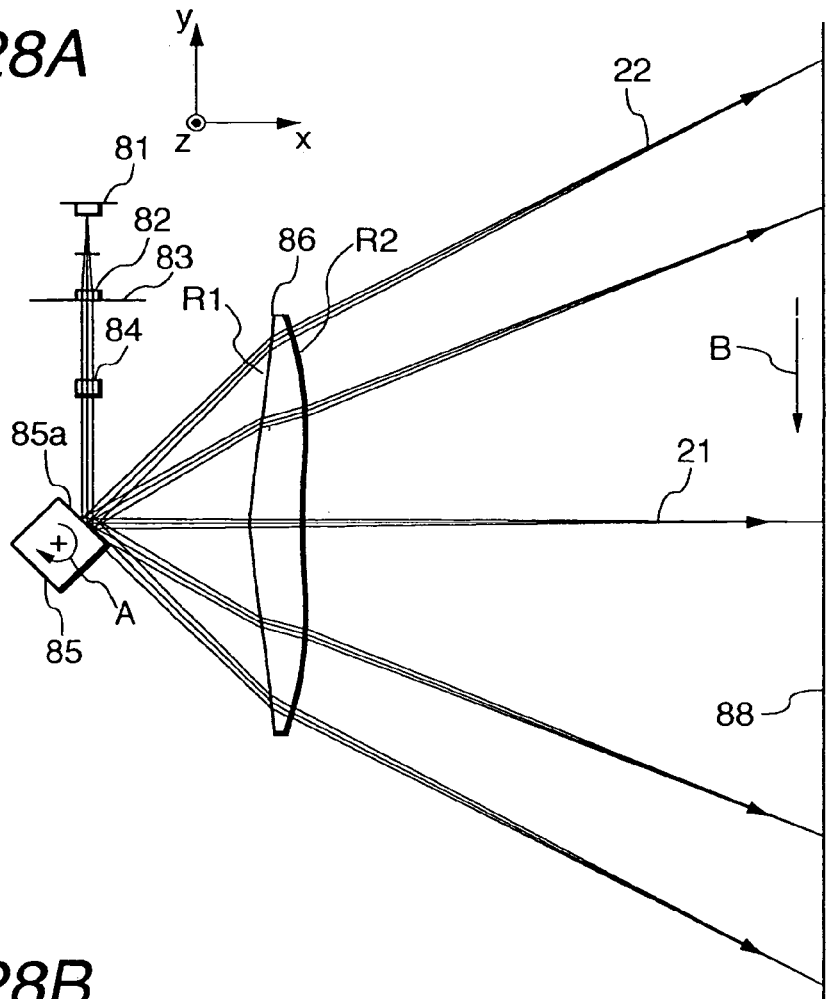
FIG. 28A
MAIN SCANNING SECTION
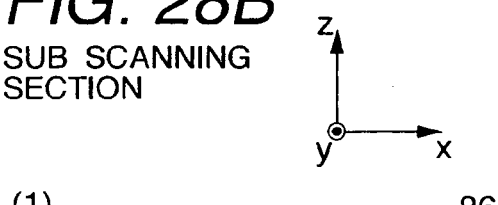
FIG. 28B
SUB SCANNING SECTION
(1) ON-AXIS BEAM
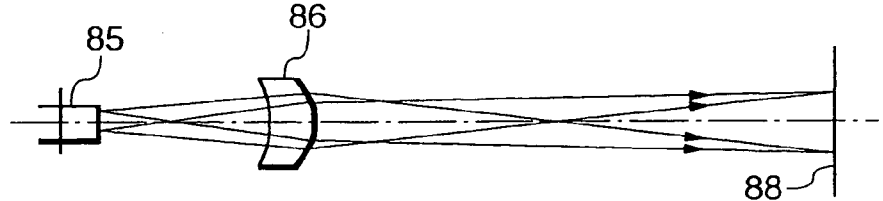
(2) MOST OFF-AXIS BEAM
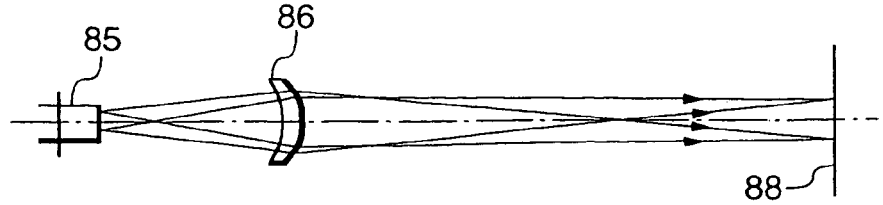

SCANNING OPTICAL APPARATUS

This application is a continuation of application Ser. No. 08/607,169 filed Feb. 26, 1996, now abandoned, which is a continuation-in-part of application Ser. No. 08/522,118 filed Aug. 31, 1995 now U.S. Pat. No. 5,818,505.

BACKGROUND OF THE INVENTION

1. Field of the Invention

This invention relates to a scanning optical apparatus and a multibeam scanning optical apparatus, and particularly to a scanning optical apparatus and a multibeam scanning optical apparatus suitable for use, for example, in an apparatus such as a laser beam printer (LBP) or a digital copying apparatus having the electrophotographic process adapted to deflect and reflect a beam of light optically modulated and emitted from light source means by a light deflector (deflecting element) comprising a rotatable polygon mirror or the like, thereafter optically scan a surface to be scanned through an imaging optical system having the fθ characteristic (fθ lens) and record image information.

2. Related Background Art

Heretofore, in the scanning optically apparatus of a laser beam printer or the like, a beam of light optically modulated and emerging from light source means in conformity with an image signal has been periodically deflected by a light deflector comprising, for example, a rotatable polygon mirror and has been converged into a spot-like shape on the surface of a photosensitive recording medium (photosensitive drum) having the fθ characteristic, and that surface has been optically scanned to thereby effect image recording.

FIG. 1 of the accompanying drawings is a schematic view of the essential portions of a scanning optical apparatus according to the prior art.

In FIG. 1, a divergent beam of light emitted from light source means 61 is made into a substantially parallel beam of light by a collimator lens 62, and the beam of light (the quantity of light) is limited by a stop 63 and enters a cylindrical lens 64 having predetermined refractive power only in a sub scanning direction. Of the parallel beam of light having entered the cylindrical lens 64, that part in a main scanning section intactly emerges in the state of a parallel beam of light. Also, that part in a sub scanning section converges and is imaged as a substantially linear image on the deflecting surface (reflecting surface) 65a of a light deflector 65 comprising a rotatable polygon mirror. Here, the main scanning section refers to a beam section the beam of light deflected and reflected by the deflecting surface of the light deflector forms with time. Also, the sub scanning section refers to a section containing the optical axis of an fθ lens and orthogonal to the main scanning section. The beam of light deflected and reflected by the deflecting surface 65a of the light deflector 65 is directed onto the surface of a photosensitive drum 68 as a surface to be scanned through an imaging optical system (fθ lens) 66 having the fθ characteristic, and the light deflector 65 is rotated in the direction of arrow A to thereby optically scan the surface of the photosensitive drum 68 and effect the recording of image information.

To effect the highly accurate recording of image information in a scanning optical apparatus of this kind, it is necessary that curvature of image field be well corrected over the entire area of a surface to be scanned and a spot diameter be uniform and that the angle and image height of the incident light have distortion (fθ characteristic) in which they are in a proportional relation. A scanning optical apparatus satisfying such optical characteristics or the correcting optical system (fθ lens) thereof has heretofore been variously proposed.

On the other hand, with the tendency of laser beam printers, digital copying apparatuses, etc. toward compactness and lower cost, similar things are required of the scanning optical apparatus.

As an apparatus which makes these requirements compatible, a scanning optical apparatus in which the fθ lens is comprised of a single lens is variously proposed, for example, in Japanese Patent Publication No. 61-48684, Japanese Laid-Open Patent Application No. 63-157122, Japanese Laid-Open Patent Application No. 4-104213, Japanese Laid-Open Patent Application No. 4-50908, etc.

Of these publications, in Japanese Patent Publication No. 61-48684 and Japanese Laid-Open Patent Application No. 63-157122, a concave single lens as on fθ lens is used on the light deflector side to converge a parallel beam of light from a collimator lens on the surface of a recording medium. Also, in Japanese Laid-Open Patent Application No. 4-104213, as fθ lenses, a concave single lens and a toroidal-surfaced single lens are used on the light deflector side and the image plane side, respectively, to make a beam of light converted into convergent light by a collimator lens enter the fθ lenses. Also, in Japanese Laid-Open Patent Application No. 4-50908, a single lens introducing a high-order aspherical surface into a lens surface is used as an fθ lens to make a beam of light converted into convergent light by a collimator lens enter the fθ lens.

However, in the scanning optical apparatuses according to the prior art described above, according to Japanese Patent Publication No. 61-48684, curvature of image field in the sub scanning direction remains and a parallel beam of light is imaged on the surface to be scanned, and this has led to the problem that the distance from the fθ lens to the surface to the scanned becomes a focal length f and is long and it is difficult to construct a compact scanning optical apparatus. In Japanese Laid-Open Patent Application No. 63-157122, the thickness of the fθ lens is great, and this has led to the problem that manufacture by molding is difficult and this makes a factor of increased cost. Japanese Laid-Open Patent Application No. 4-104213 has suffered from the problem that distortion remains. In Japanese Laid-Open Patent Application No. 4-50908, an fθ lens having a high-order aspherical surface is used and aberrations are corrected well, but there has been the problem that jitter of a period corresponding to the number of polygon surfaces occurs due to the mounting error of a polygon mirror which is a light deflector.

Further, problems common to these fθ lenses each comprised of a single lens has included the problem that due to the non-uniformity of the lateral magnification in the sub scanning direction between the light deflector and the surface to be scanned, the spot diameter in the sub scanning direction changes depending on image height.

FIGS. 2A and 2B of the accompanying drawings are cross-section views of the essential portions of a single beam scanning optical apparatus in the main scanning direction and the sub scanning direction, respectively, and show changes in the spot diameter (F number) in the sub scanning direction due to image height. In these figures, the same elements as the elements shown in FIG. 1 are given the same reference numerals.

Usually, in a plane inclination correcting optical system, it is necessary to bring the deflecting surface of a light deflector and a surface to be scanned into an optically conjugate relation (imaging relation) in order to optically correct the plane inclination of the deflecting surface. Accordingly, in an fθ lens having a predetermined lens shape in the main scanning section as in the aforedescribed examples of the prior art, lateral magnification is high on the axis (on-axis beam 21) as indicated at (1) in FIG. 2B, and lateral magnification becomes low off the axis (most off-axis beam 22) as indicated at (2) in FIG. 2B (there is also a case where this becomes converse depending on the lens shape in the main scanning section).

Thus, irregularity occurs to the lateral magnification in the sub scanning direction depending on the lens shape of the fθ lens in the main scanning plane thereof and a change in the spot diameter in the sub scanning direction due to image height occurs.

On the other hand, the ability of higher speed scanning is required of a scanning optical apparatus for use in an LBP because of the tendency of the LBP toward higher speed and higher accuracy, and from limitations such as the number of revolutions of a motor which is scanning means and the number of surfaces of a polygon mirror which is deflecting means, particularly the demand for a multibeam scanning optical apparatus capable of scanning a plurality of beams of light at a time is growing.

The above-described non-uniformity of the lateral magnification in the sub scanning direction makes the curve of the scanning line when the position of a light source (light source unit) is off the optical axis in Z direction indicated in FIGS. 2A and 2B and therefore, an optical system such as a multi-beam scanning optical system (multibeam scanning optical apparatus) which scans a surface to be scanned at a time by the use of a plurality of beams of light off the optical axis has suffered from the problem that the scanning line bends on the surface to be scanned and as a result, the deterioration of image quality due to pitch irregularity occurs.

SUMMARY OF THE INVENTION

It is a first object of the present invention to provide a compact scanning optical apparatus suitable for highly accurate printing in which when a beam of light from a light source converted by a collimator lens or the like is to be imaged on a surface to be scanned by an fθ lens through a light deflector, the lens shape (the main scanning plane shape) of the fθ lens in the main scanning plane thereof is optimized to thereby correct curvature of image field, distortion, etc. and the non-uniformity of lateral magnification in the sub scanning direction between the light deflector and the surface to be scanned is eliminated by only the lens shape (the sub scanning plane shape) in the sub scanning plane, independently of the lens shape in the main scanning plane, whereby any change in F number (F No.) in the sub scanning direction due to image height, i.e., any change in spot diameter, can be suppressed.

It is a second object of the present invention to provide a compact multibeam scanning optical apparatus suitable for highly accurate printing in which a plurality of beams of light from a light source converted by a collimator lens or the like is to be imaged on a surface to be scanned by an fθ lens through a light deflector, the lens shape (the main scanning plane shape) of the fθ lens in the main scanning plane thereof is optimized to thereby correct curvature of image field, distortion, etc. and the non-uniformity of lateral magnification in the sub scanning direction between the light deflection and the surface to be scanned is eliminated by only the lens shape (the sub scanning plane shape) in the sub scanning plane, independently of the lens shape in the main scanning plane, whereby any change F number (F No.) in the sub scanning direction in spot diameter, can be suppressed and a beam of light from the light source which is off the optical axis in the sub scanning direction can also be scanned highly accurately without the curve of the scanning line occurring.

The scanning optical apparatus of the present invention is (1-1) a scanning optical apparatus in which a beam of light emitted from light source means is imaged into a linear shape long in the main scanning direction on the deflecting surface of a deflecting element through a first optical element and a second optical element and the beam of light deflected by the deflecting element is imaged into a spot-like shape on a surface to be scanned through a third optical element to thereby scan the surface to be scanned, characterized in that the third optical element comprise a single lens, the opposite lens surfaces of the single lens both comprise a tori surface of an aspherical shape in the main scanning plane, and the curvature thereof in the sub scanning section is continuously varied from the on-axis toward the off-axis in the effective portion of the lens to thereby suppress any change of F number in the sub scanning direction due to the image height of the beam of light incident on the surface to be scanned.

Particularly, it is characterized in (1-1-1) that the light source means has a plurality of light source means has a plurality of light source units capable of being independently modulated, (1-1-2) that when the curve amounts of the loci, in the main scanning plane, of the front side principal plane and the rear side principal plane of the third optical element in the sub scanning direction (the difference in the direction of the optical axis between the most off-axis principal plane position and the on-axis principal plane position) are xm and xu, respectively, the following condition xm≦dx≦xu, is satisfied:
where $$dx = \frac{Ipri \cdot Epri(\cos\theta img - \cos\theta por)}{Ipri \cdot \cos\theta por + Epri \cdot \cos\theta img}$$

Ipri: the distance from the deflecting surface of the deflecting element in the on-axis beam to the front side principal plane in the sub scanning direction;

Epri: the distance from the rear side principal plane in the sub scanning direction in the on-axis beam to the surface to be scanned;

θpor: the angle formed in the main scanning plane by the most off-axis beam deflected by the deflecting element with respect to the optical axis;

θimg: the angle formed in the main scanning plane by the most off-axis beam incident on the surface to be scanned with respect to the optical axis;

(1-1-3) that the sign of the curvature of at least one of the opposite lens surfaces of the single lens constituting the third optical element in the subscanning plane is reversed from the on-axis toward the off-axis; and (1-1-4) that the third optical element is made by plastic molding; or (1-1-5) that the third optical element is made by glass molding.

The multibeam scanning optical apparatus of the present invention is (2-1) a multibeam scanning optical apparatus in which a plurality of independently modulated beams of light emitted from light source means are imaged into linear shapes long in the main scanning direction on the deflecting surface of a deflecting element through a first optical element and a second element and the plurality of beams of light deflected by the deflecting element are imaged into a spot-like shape on a surface to be scanned through a third optical element to thereby scan the surface to be scanned, characterized in that the third optical element comprises a single lens, and the curvatures of the opposite lens surfaces of the single lens in the sub scanning direction are continuously varied from the on-axis toward the off-axis to thereby suppress any change of F number in the sub scanning direction due to the image height of the beam light incident on the surface to be scanned.

Particularly, it is characterized in (2-1-1) that when the maximum value and minimum value of the F number of the beam of light incident on the surface to be scanned in the sub scanning direction are Fmax and Fmin, respectively, the curvatures of the opposite lens surfaces of the single lens constituting the third optical element in the sub scanning direction are continuously varied from the on-axis toward the off-axis so as to satisfy the condition that $Fmin/Fmax \leq 0.9$, (2-1-2) that the sign of the curvature of at least one of the opposite lens surfaces of the single lens constituting the third optical element in the sub scanning direction is reversed from the on-axis toward the off-axis, (2-1-3) that the curvatures of the opposite lens surfaces of the single lens constituting the third optical element in the sub scanning direction are varied asymmetrically with respect to the optical axis from the on-axis toward the off-axis, and (2-1-4) that the third optical element is made by plastic molding, or (2-1-5) that the third optical element is made by glass molding.

(2-2) a multibeam scanning optical apparatus in which a plurality of independently modulated beams of light emitted from light source means are imaged into a linear shape long in the main scanning direction on the deflecting surface of a deflecting element through a first optical element and a second optical element and the plurality of beams of light deflected by the deflecting element are imaged into a spot-like shape on a surface to be scanned through a third optical element is characterized in that the third optical element is comprised of at least two lenses, and the curvatures of at least two lens surfaces of the two lenses in the sub scanning direction are continuously varied from the on-axis toward the off-axis to thereby suppress any change of F number in the sub-scanning direction due to the image height of the beam of light incident on the surface to be scanned.

Particularly, it is characterized in (2-2-1) that when the maximum value and minimum value of the F number of the beam of light incident on the surface to be scanned in the sub-scanning direction are Fmax and Fmin, respectively, the curvatures of at least two lens surfaces of the two lenses constituting the third optical element in the sub scanning direction are continuously varied from the on-axis toward the off-axis so as to satisfy the condition that $Fmin/Fmax \geq 0.9$, (2-2-2) that the sign of the curvature of at least one lens surface of the two lenses constituting the third optical element in the sub scanning direction is reversed from the on-axis toward the off-axis, (2-2-3) that the curvatures of at least two surfaces of the two lenses constituting the third optical element in the sub scanning direction are varied asymmetrically with respect to the optical axis from the on-axis toward the off-axis, and (2-2-4) that at least one of the two lenses constituting the third optical element is made by plastic molding, or (2-2-5) that at least one of the two lenses constituting the third optical element is made by glass molding.

BRIEF DESCRIPTION OF THE DRAWINGS

FIG. 5 is an illustration showing the aspherical surface shape of an fθ lens in Embodiment 1 of the present invention.

FIGS. 8A and 8B are cross-sectional views of the essential portions of Embodiment 2 of the present invention in the main scanning direction and the sub scanning direction, respectively.

FIG. 9 is an illustration showing the aspherical surface shape of an fθ lens in Embodiment 2 of the present invention.

FIGS. 24A and 24B are cross-sectional views of the essential portions of Embodiment 6 of the present invention in the main scanning direction and the sub scanning direction, respectively.

FIGS. 28A and 28B are cross-sectional views of the essential portions in the main scanning direction and the sub scanning direction, respectively, when multibeam scanning was effected by the use of the prior-art single beam scanning optical apparatus shown in FIGS. 2A and 2B.

DESCRIPTION OF THE PREFERRED EMBODIMENTS

Figure 1:
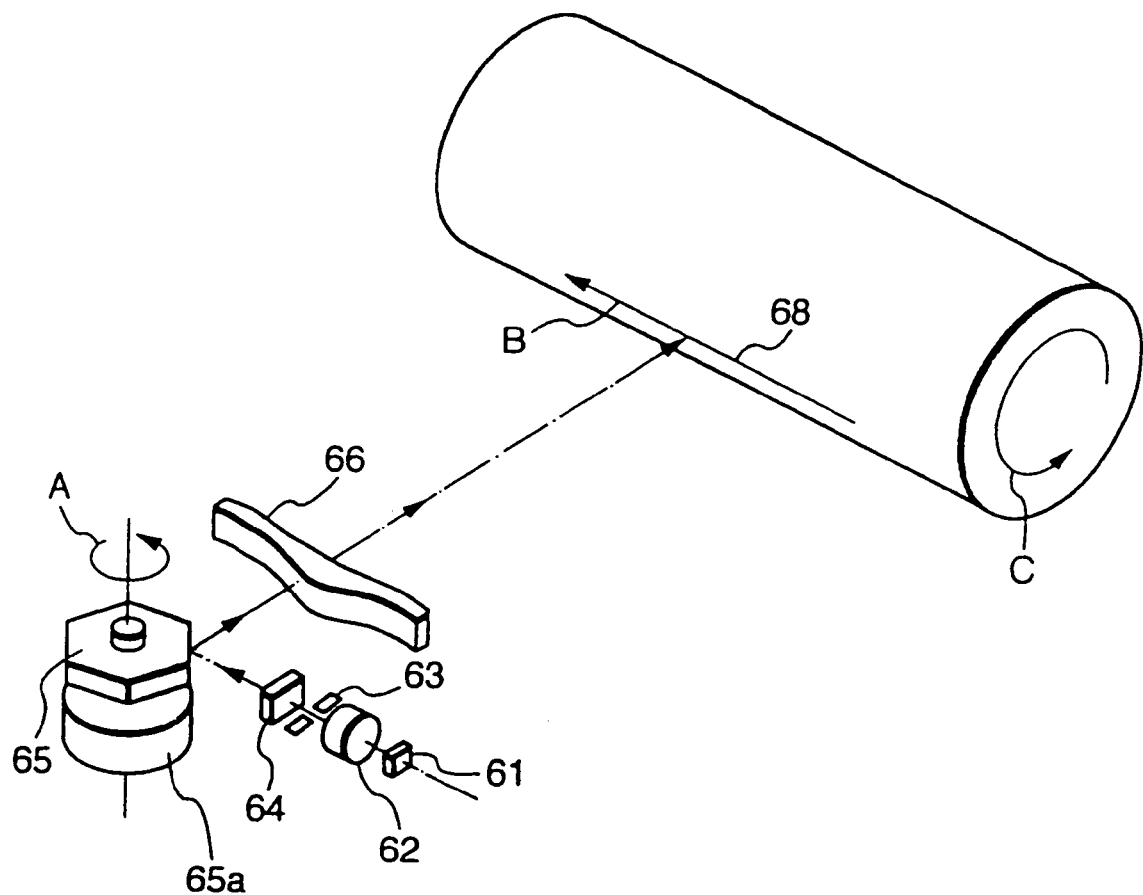
FIG. 1 is a schematic view of the essential portions of the optical system of a scanning optical apparatus according to the prior art.
Figure 2A:
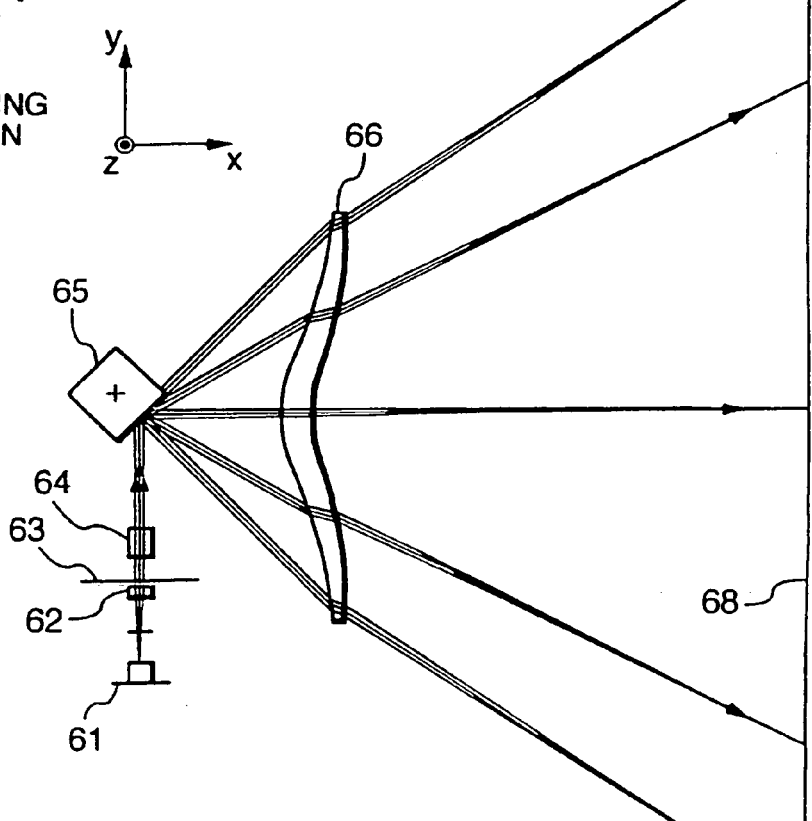
FIGS. 2A and 2B are cross-sectional views of the essential portions of the scanning optical apparatus according to the prior art in the main scanning direction and the sub scanning direction, respectively.
Figure 2B:
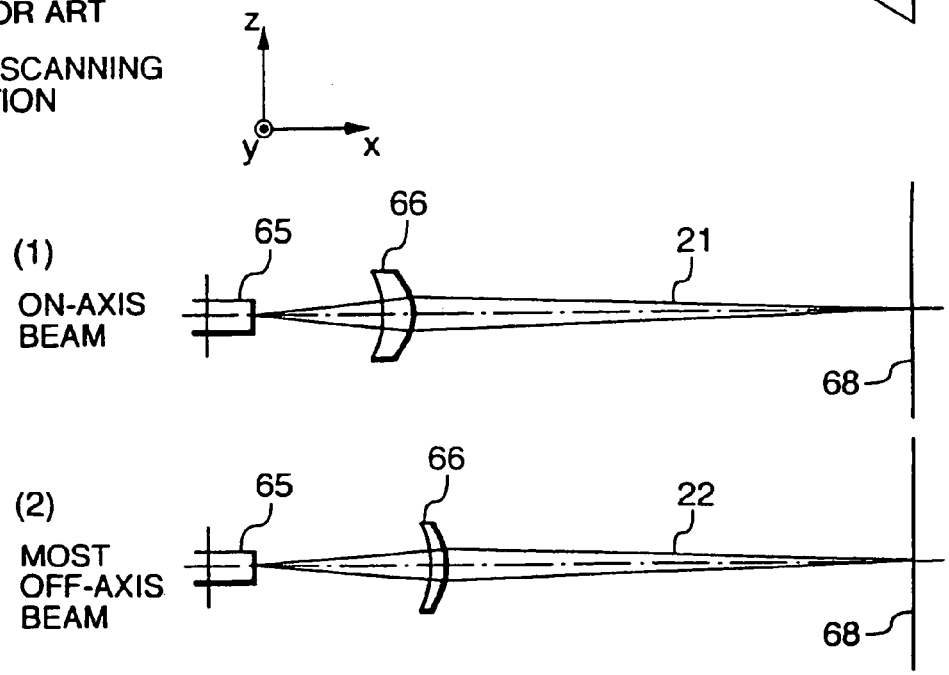
Figure 3:
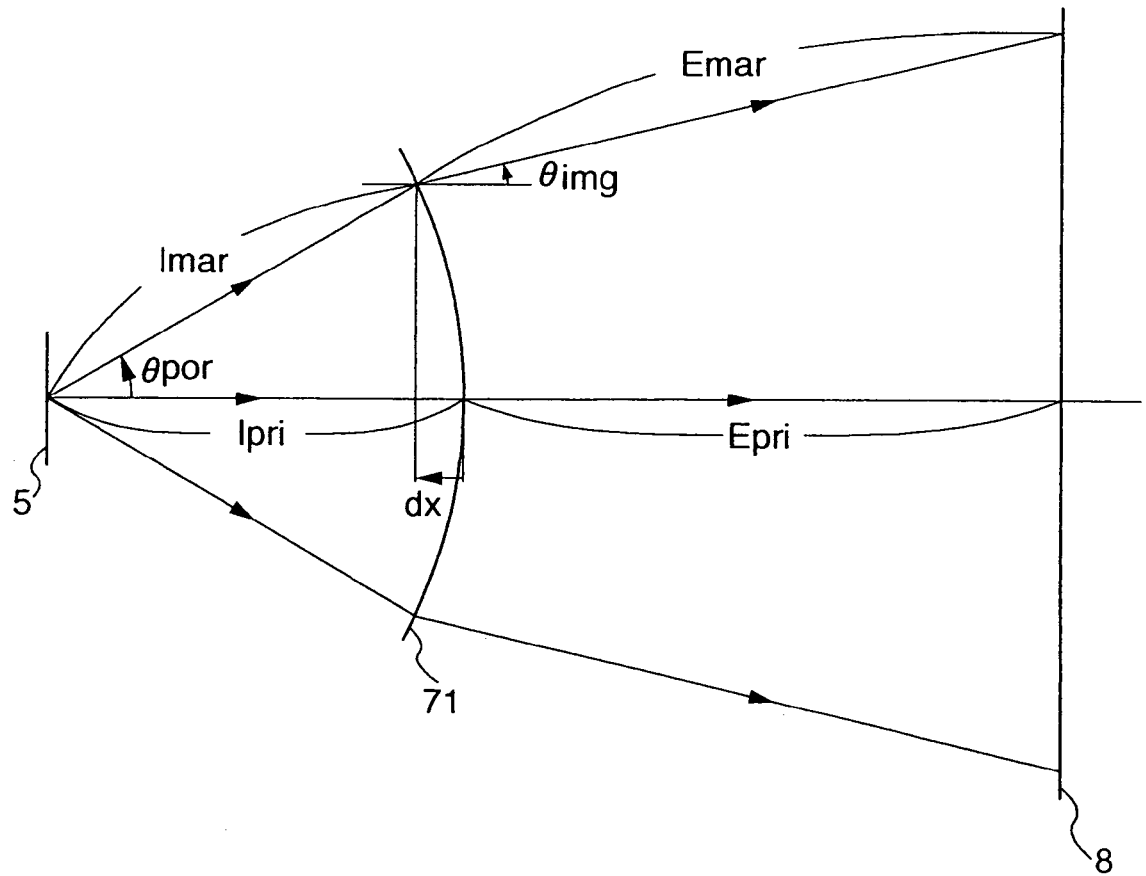
FIG. 3 is a cross-sectional view of the essential portions of a scanning optical apparatus between a deflecting element and a surface to be scanned in the main scanning direction.

Before some embodiments of the scanning optical apparatus of the present invention are described, means for achieving the objects of the present invention will first be, described. To achieve the above-described objects in the scanning optical apparatus, it is necessary to optimize the lens shape of the fθ lens and to uniformize the lateral magnifications in the sub scanning direction on the axis and off the axis. FIG. 3 is a cross-sectional view of the essential portions in the main scanning direction between the light deflector (deflecting element) of the scanning optical apparatus and the surface to be scanned. To uniformize the lateral magnifications in the sub scanning direction on the axis and off the axis, it is necessary to determine the principal plane position so that the ratios of the lengths of optical path on the axis and off the axis may be equal to each other.

Accordingly, the principal plane position of the fθ lens in the sub scanning direction is determined so as to satisfy the following conditions:

$$Ipri:Epri = Imar:Emar$$

$$Ipri \cdot Emar = Epri \cdot Imar \quad (a)$$

where
Ipri: the distance from the deflecting surface of the light deflector to the front side principal plane in the sub scanning direction in the on-axis beam;
Epri: the distance from the rear side principal plane in the sub scanning direction to the surface to be scanned in the on-axis beam;
Imar: the distance from the deflecting surface of the light deflector to the front side principal plane in the sub scanning direction in the most off-axis beam;
Emar: the distance from the rear side principal plane in the sub scanning direction to the surface to be scanned in the most off-axis beam.

Generally, the off-axis beam is refracted in the direction of the optical axis in the main scanning plane in order to satisfy the fθ characteristic and therefore, a focus 71 in the main scanning plane of the principal plane in the sub scanning direction for satisfying the above expression (a) is a plane curved toward a light deflector 5 off the axis as shown in FIG. 3. Here, when the curve amount on the most off-axis is dx, $$Emar = (Epri + dx)/\cos\theta img$$

$$Imar = (Ipri - dx)/\cos\theta por$$

and consequently, $$Ipri(Epri + dx)/\cos\theta img = Epri(Ipri - dx)/\cos\theta img \quad (b)$$

$$dx(Ipri \cdot \cos\theta por + Epri \cdot \cos\theta img) = Ipri \cdot Epri(\cos\theta img - \cos\theta por)$$

$$dx = \frac{Ipri \cdot Epri(\cos\theta img - \cos\theta por)}{Ipri \cdot \cos\theta por + Epri \cdot \cos\theta img}$$

where
θpor: the angle formed in the main scanning plane by the most off-axis beam deflected by the light deflector with respect to the optical axis of the fθ lens;
θimg: the angle formed in the main scanning plane by the most off-axis beam incident on the surface to be scanned with respect to the optical axis of the fθ lens.

Accordingly, to uniformize the lateral magnification in the sub scanning direction, it is necessary to set the curve amount dx of the locus of the principal plane in the sub scanning direction to a value derived from the above expression (b).

That is, when in an actual scanning optical apparatus, the curve amounts of the loci, in the main scanning plane, of the front side principal plane and the rear side principal plane of an fθ lens in the sub scanning direction (the difference in the direction of the optical axis between the most off-axis principal plane position and the on-axis principal plane position) are xm and xu, respectively, it is desirable to determine the principal plane position so as to satisfy the condition that $$xm \leq dx \leq xu. \quad (1)$$

If the above conditional expression (1) is departed from, irregularity will occur to the lateral magnification in the sub scanning direction and the change in spot diameter due to image height will become great, and this will pose a problem in practice.

Next, as regards a method of changing the principal plane position in the sub scanning direction, the deflecting surface of the light deflector and the surface to be scanned are brought into optically conjugate relationship with each other in the sub scanning direction of the fθ lens as previously described to thereby effect the correction of plane inclination and therefore, the refractive power itself of the fθ lens cannot be varied.

Accordingly, the first lens surface (R1 surface) and the second lens surface (R2 surface) of the fθ lens in the sub scanning direction are bent to thereby effect the movement of the principal plane position. By the bending, the principal plane of the lens can be moved without the refractive power of the lens itself being changed and therefore, the meridian line r is continuously changed from the on-axis toward the off-axis and an optimum lens shape can be provided depending on location, whereby the lateral magnification in the sub scanning direction can be uniformized.

By optimizing the lens shape of the fθ lens in this manner, the F number (F No.) in the sub scanning direction of the beam of light incident on the surface to be scanned can be uniformized, and the variation in the spot diameter in the sub scanning direction due to image height which has heretofore been a problem peculiar to a single-lens fθ lens can be minimized.

Also for a beam of light emerging from a light source (light source unit) off the optical axis, the surface to be scanned can be highly accurately scanned without causing the curve of the scanning line, whereby there can be provided a scanning optical apparatus suitable also for multibeam scanning.

Some embodiments of the present invention will now be described.

Figure 4A:
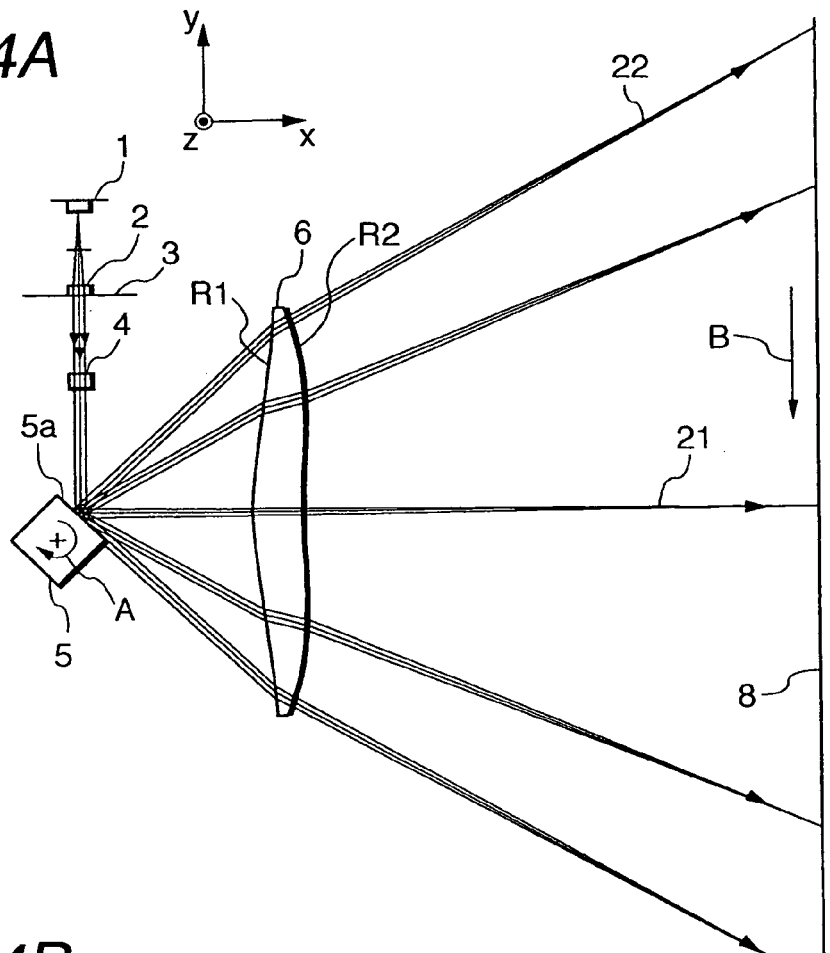
FIGS. 4A and 4B are cross-sectional views of the essential portions of Embodiment 1 of the present invention in the main scanning direction and the sub scanning direction, respectively.
Figure 4B:
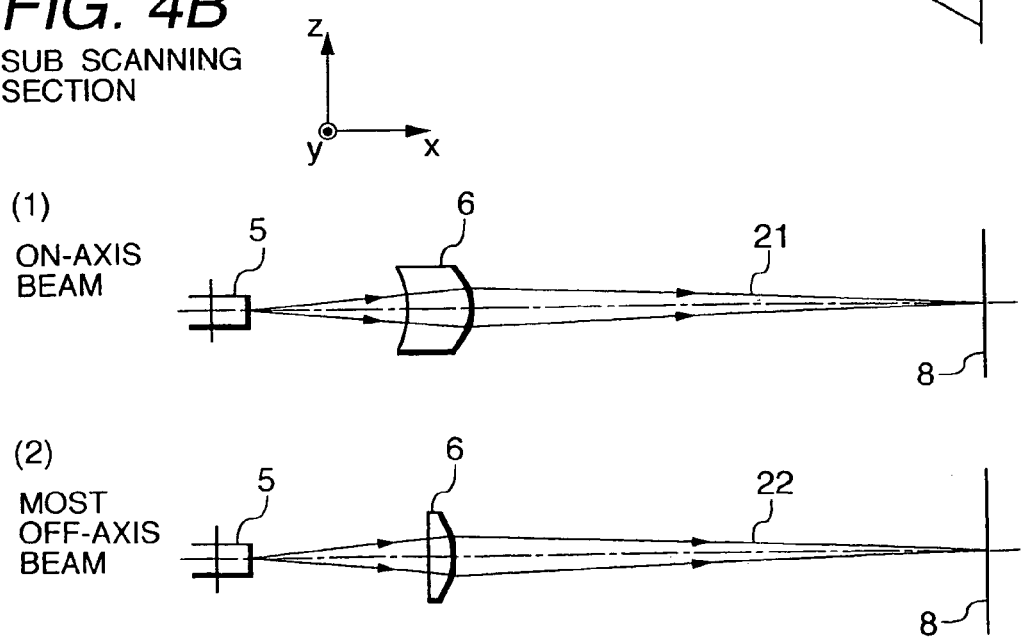

FIGS. 4A and 4B are cross-sectional views of Embodiment 1 of the present invention in the main scanning direction and the sub scanning direction, respectively.

In these figures, reference numeral 1 designates light source means (a light source unit) comprising, for example, a semiconductor laser.

Reference numeral 2 denotes a collimator lens as a first optical element which converts a divergent beam of light emitted from the light source means 1 into a convergent beam of light. Reference numeral 3 designates an aperture stop which regularizes the diameter of the beam of light passing therethrough.

Reference numeral 4 denotes a cylindrical lens as a second optical element which has predetermined refractive power only in the sub scanning direction and causes the beam of light passed through the aperture stop 3 to be imaged as a substantially linear image on the deflecting surface 5a of a light deflector (deflecting element) 5 which will be described later in the sub scanning section.

Reference numeral 5 designates a light deflector as a deflecting element which comprises, for example, a polygon mirror (rotatable polygon mirror) and is rotated at a predetermined speed in the direction of arrow A by drive means (not shown) such as a motor.

Reference numeral 6 denotes an fθ lens (imaging optical system) as a third optical element comprising a lens having the fθ characteristic and disposed more toward the light deflector 5 side than the intermediate portion between the light deflector 5 and a photosensitive drum surface 8 as a surface to be scanned. In the present embodiment, the opposite lens surface of the fθ lens 6 both comprise a toric surface which is aspherical in the main scanning plane, and continuously varies the curvature in the sub scanning plane (a plane containing the optical axis of the third optical element and orthogonal to the main scanning plane) from the on-axis toward the off-axis in the effective portion of the lens. Thereby, in Embodiment 1, the change in F number (F No.) in the sub scanning direction due to the image height of the beam of light incident on the surface 8 to be scanned, i.e., the change in spot diameter, is minimized. The fθ lens 6 causes the beam of light based on image information deflected and reflected by the light deflector 5 to be imaged on the photosensitive drum surface 8 and corrects the plane inclination of the deflecting surface of the light deflector 5.

In Embodiment 1, the fθ lens 6 may be made by plastic molding or may be made by glass molding.

In Embodiment 1, the divergent beam of light emitted from the semiconductor laser 1 is converted into a convergent beam of light by the collimator lens 2, and this beam of light (the quantity of light) is limited by the aperture stop 3 and enters the cylindrical lens 4. The beam of light having entered the cylindrical lens 4, in the main scanning section, emerges therefrom intactly in that state. Also, in the sub scanning section, it converges and is imaged as a substantially linear image (a linear image long in the main scanning direction) on the deflecting surface 5a of the light deflector 5. The beam of light deflected and reflected by the deflecting surface 5a of the light deflector 5 is directed onto the photosensitive drum surface 8 through the fθ lens 6 having different refractive powers in the main scanning direction and the sub scanning direction, and scans the photosensitive drum surface 8 in the direction of arrow B by the light deflector 5 being rotated in the direction of arrow A. Thereby, image recording is effected on the photosensitive drum 8 which is a recording medium.

In Embodiment 1, the lens shape of the fθ lens in the main scanning direction is an aspherical surface shape which can be represented by a function up to the tenth-order, and the lens shape in the sub scanning direction is comprised of a spherical surface continuously varying in the direction of image height. The lens shape, when for example, the point of intersection between the fθ lens and the optical axis is the origin and the direction of the optical axis is the X-axis and the axis orthogonal to the optical axis in the main scanning plane is the Y-axis and the axis orthogonal to the optical axis in the sub scanning plane is the Z-axis, is such that the generating-line direction corresponding to the main scanning direction can be represented by the following expression:

$$X = \frac{Y^2/R}{1+(1-(1+K)(Y/R)^2)^{1/2}} + B_4 Y^4 + B_6 Y^6 + B_8 Y^8 + B_{10} Y^{10} \quad (c)$$

(where R is the radius of curvature, K, $B_4$, $B_6$, $B_8$ and $B_{10}$ are aspherical surface coefficients) and the meridian-line direction corresponding to the sub scanning direction (the direction orthogonal to the main scanning direction containing the optical axis) can be represented by the following expression:

$$S = \frac{Z^2/r'}{1+(1-(Z/r')^2)^{1/2}}, \quad (d)$$

(where $r' = r(1 + D_2 Y^2 + D_4 Y^4 + D_6 Y^6 + D_8 Y^8 + D_{10} Y^{10})$).

Table 1 below shows the optical arrangement in Embodiment 1 and the aspherical surface coefficients of the fθ lens 6.

TABLE 1

(Embodiment 1)

| | | | | shape of fθ lens | |
| --- | --- | --- | --- | --- | --- |
| | | | | 1st surface | 2nd surface |
| wavelength used | λ(nm) | 780 | | | |
| refractive index of fθ lens | n | 1.519 | R | 6.7814E+01 | 1.6154E+02 |
| angle of incidence on polygon | θi | −90 | K | −1.6787E+01 | −1.0814E+02 |
| maximum angle of emergence from polygon | θmax | 45 | B4 | −9.8604E−07 | −2.2909E−06 |

TABLE 1-continued (Embodiment 1)

| | | | shape of fθ lens | |
| --- | --- | --- | --- | --- |
| | | | 1st surface | 2nd surface |
| polygon – fθ lens | e | 36 | B6 | 1.5479E−11 | 7.1426E−10 |
| center thickness of fθ lens | d | 11 | B8 | 8.7055E−14 | −3.2030E−13 |
| fθ lens – surface to be scanned | Sk | 110.5 | B10 | −4.7942E−18 | 7.9836E−17 |
| maximum effective diameter of fθ lens | Ymax | 42 | r | −2.7332E+01 | −1.1859E+01 |
| focal length of fθ lens | ft | 213.7 | D2S | 1.2604E−03 | 4.9796E−04 |
| degree of convergence of collimator polygon – natural converging point | fc | 317.3 | D43 | 1.2255E−06 | −2.0734E−07 |
| | | | D6S | 8.4502E−10 | 2.3479E−10 |
| | | | D8S | −6.3449E−13 | −1.0939E−13 |
| | | | D10S | 1.3148E−15 | 1.5644E−17 |
| | | | D2E | 9.3936E−04 | 4.4938E−04 |
| | | | D4E | 2.027E−06 | −4.6627E−08 |
| | | | D6E | 7.0546E−10 | 1.1322E−10 |
| | | | D8E | −1.2936E−12 | −5.8704E−14 |
| | | | D10E | 2.3372E−15 | 4.3944E−18 |

Figure 6:
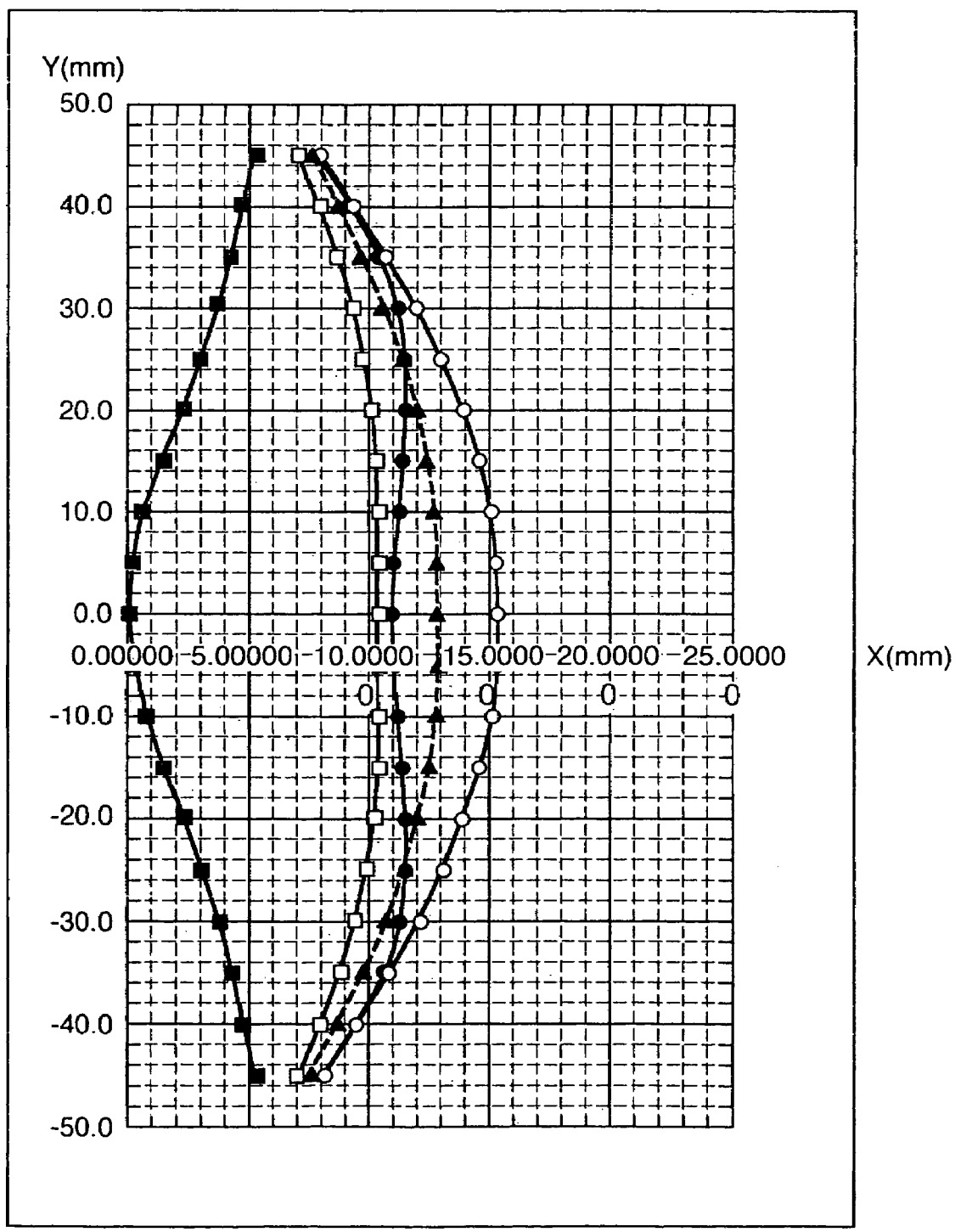
FIG. 6 is an illustration showing the shape of the fθ lens in Embodiment 1 of the present invention in the main scanning direction.

FIG. 5 is an illustration showing a change of curvature in the sub scanning direction relative to the position of the fθ lens 6 in the lengthwise direction. As shown in FIG. 5, the curvature of the meniscus shape is sharp on the axis and becomes plano-convex from the on-axis toward the off-axis. FIG. 6 is an illustration showing the aspherical surface shape of the fθ lens 6. In FIG. 6, thick solid lines indicate the lens surface shapes in the main scanning direction, and thin solid lines are the loci of the principal plane in the sub scanning direction, and indicate the front side principal plane and the rear side principal plane.

In Embodiment 1, the curve amount dx of the locus of the principal plane for suppressing the change of lateral magnification in the sub scanning direction due to image height is dx=6.50 from

Ipri=48.73 Epri=108.77

θpor=44.4° θimg=29.10°.

Also, the curve amount xm of the locus of the front side principal plane of the fθ lens 6 in the sub scanning direction and the curve amount xu of the locus of the rear side principal plane thereof are xm=3.24 xu=7.48 and these values satisfy the aforementioned conditional expression (1) (xm≦dx≦xu).

Figure 7:
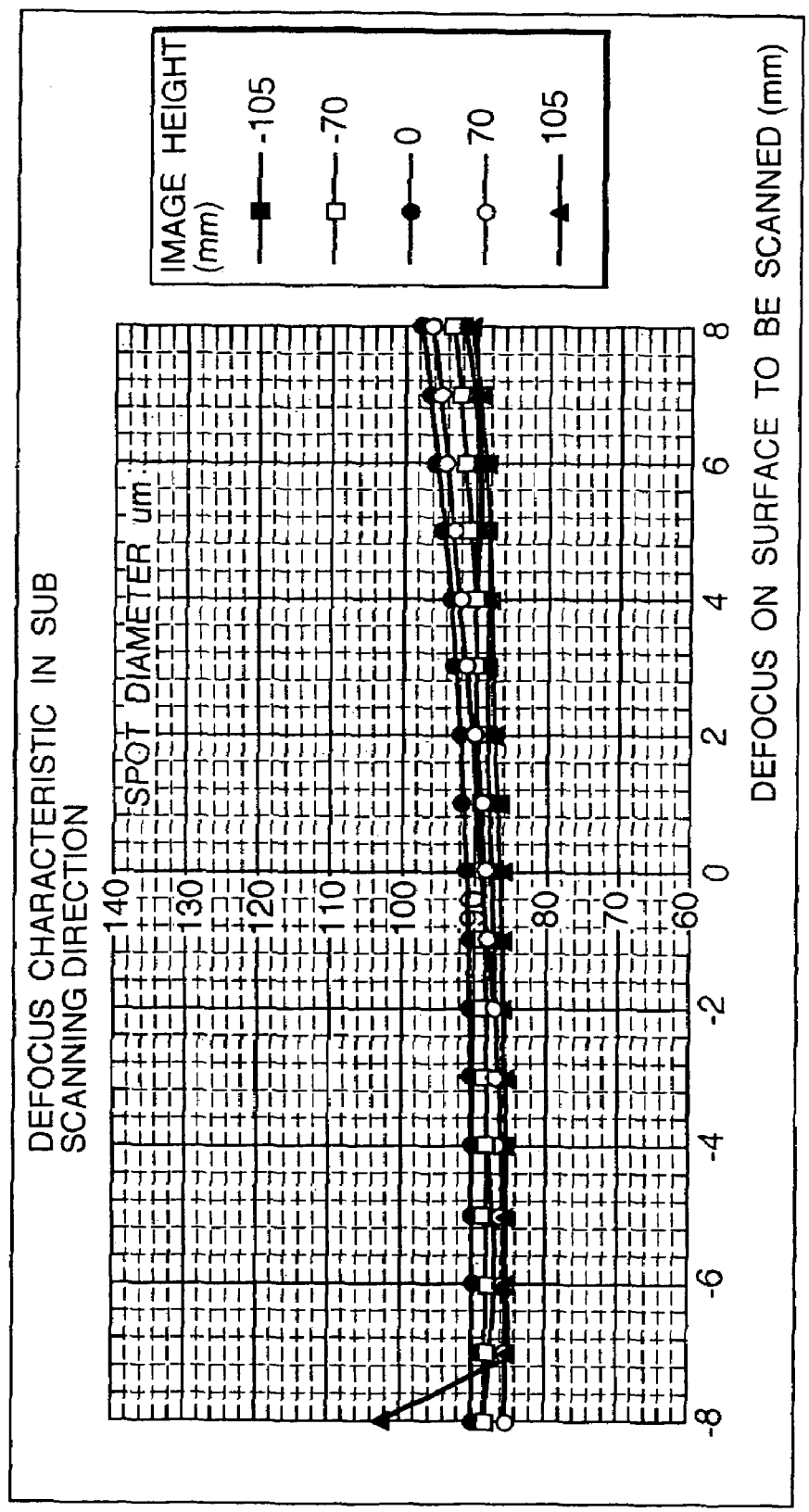
FIG. 7 is an illustration showing the defocus characteristic of a spot diameter in the sub scanning direction on a surface to be scanned in Embodiment 1 of the present invention.

Thereby, in Embodiment 1, the lateral magnification in the sub scanning direction between the light deflector 5 and the surface 8 to be scanned can be uniformized on the axis and off the axis to a level free of any practical problem, and as shown in FIG. 7, the change of the spot diameter in the sub scanning direction due to image height can be minimized. Thereby, there is achieved a scanning optical apparatus which is inexpensive and suitable for highly accurate printing.

FIGS. 8A and 8B are cross-sectional views of Embodiment 2 of the present invention in the main scanning direction and the sub scanning direction, respectively. In FIGS. 8A and 8B, the same elements as the elements shown in FIGS. 4A and 4B are given the same reference numerals.

The differences of Embodiment 2 from the aforedescribed Embodiment 1 are that the divergent beam of light emitted from the semiconductor laser (the light source unit) is converted not into a convergent beam of light but into a parallel beam of light by the collimator lens and that corresponding thereto, the lens shape of the fθ lens is made different. In the other points, the construction and optical action of Embodiment 2 are substantially similar to those of Embodiment 1, whereby a similar effect is obtained.

Table 2 below shows the optical arrangement in Embodiment 2 and the aspherical surface coefficients of an fθ lens 26.

TABLE 2

(Embodiment 2)

| | | | shape of fθ lens | |
| --- | --- | --- | --- | --- |
| | | | 1st surface | 2nd surface |
| wavelength used | λ(nm) | 780 | | | |
| refractive index of fθ lens | n | 1.519 | R | 2.2000E+02 | −1.1768E+02 |
| angle of incidence on polygon | θi | −60 | K | 0.0000E+00 | 0.0000E+00 |
| maximum angle of emergence from polygon | θmax | 42 | B4 | −1.1899E−06 | −5.2353E−07 |
| polygon – fθ lens | e | 40 | B6 | 3.1847E−10 | −8.6171E−11 |
| center thickness of fθ lens | d | 15 | B8 | 2.9372E−14 | 1.8432E−14 |
| fθ lens – surface to be scanned | Sk | 146.45 | B10 | 3.2427E−19 | 8.4808E−18 |
| maximum effective diameter of fθ lens | Ymax | 43 | r | −1.1312E+02 | −1.7832E+01 |
| focal length of fθ lens | ft | 150 | d2S | −4.8301E−04 | 4.5963E−05 |
| | | | d4S | 1.8211E−07 | −7.1210E−08 |
| | | | d6S | −1.0230E−10 | 1.7390E−11 |
| | | | d8S | 7.2371E−14 | −4.3029E−15 |
| | | | d10S | −2.1962E−17 | −1.4545E−19 |
| | | | d2E | −7.0160E−04 | 1.1994E−05 |

TABLE 2-continued (Embodiment 2)

| | | shape of fθ lens | |
|---|---|---|---|
| | | 1st surface | 2nd surface |
| | d4E | 3.6411E−07 | −5.9970E−08 |
| | d6E | −1.0351E−11 | −1.7699E−12 |
| | d8E | −7.6585E−14 | 2.1846E−14 |
| | d10E | 2.0350E−17 | −9.2552E−18 |

Figure 10:
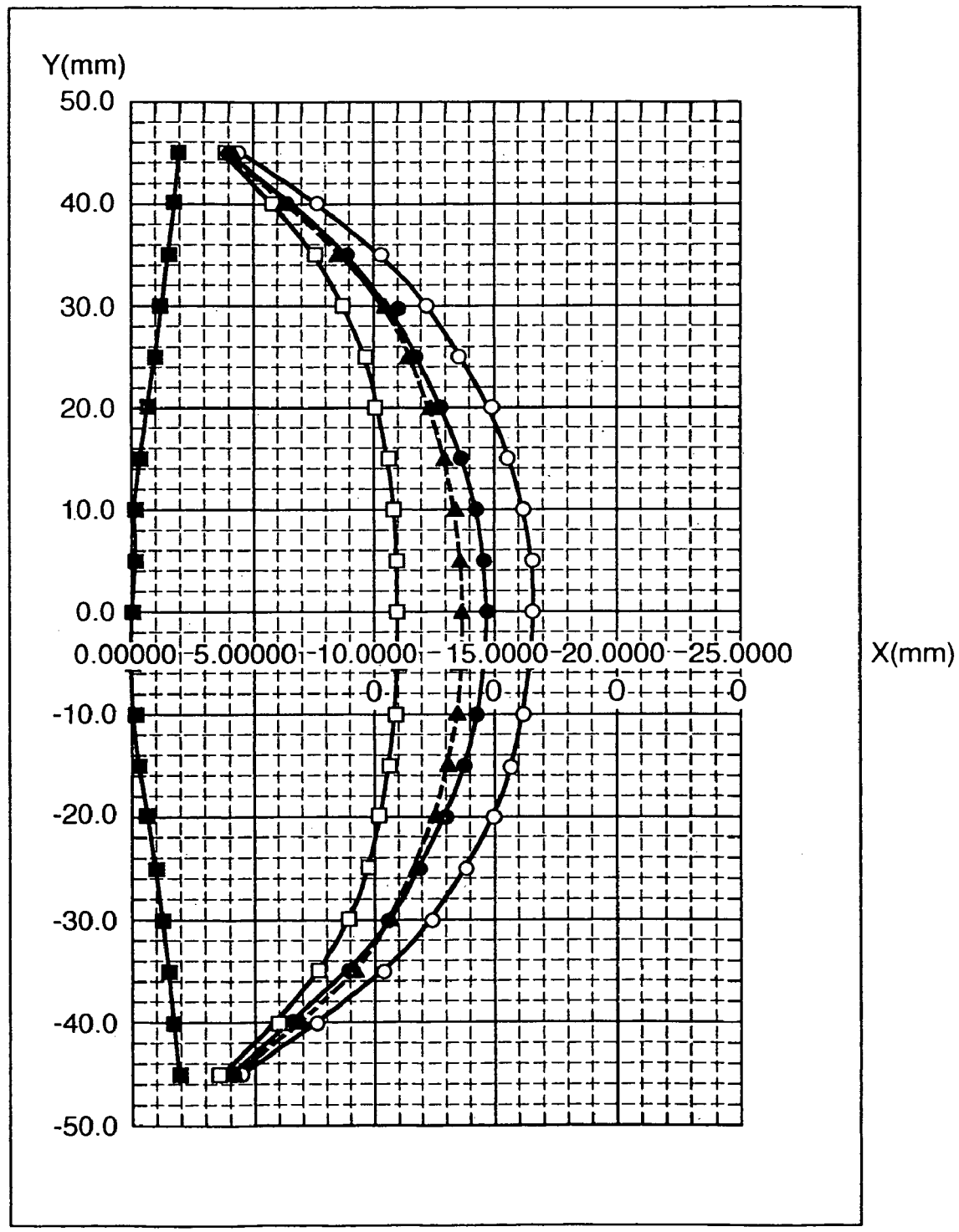
FIG. 10 is an illustration showing the defocus characteristic of the spot diameter in the sub scanning direction on a surface to be scanned in Embodiment 2 of the present invention.

FIG. 9 is an illustration showing a change of curvature in the sub scanning direction relative to the position of the fθ lens 26 in the lengthwise direction. As shown in FIG. 9, the curvature of the meniscus shape becomes sharper from the on-axis toward the off-axis. FIG. 10 is an illustration showing the aspherical surface shape of the fθ lens 26. In FIG. 10, thick solid lines indicate the lens surface shape in the main scanning direction, and thin solid lines are the loci of the principal plane in the sub scanning direction, and indicate the front side principal plane and the rear side principal plane.

In Embodiment 2, the curve amount dx of the locus of the principal plane for suppressing the change of lateral magnification in the sub scanning direction due to image height is dx=7.60 from

Ipri=53.94 Epri=147.51

θpor=42.0° θimg=24.57°.

Also, the curve amount xm of the locus of the front side principal plane of the fθ lens 26 in the sub scanning direction and the curve amount xu of the locus of the rear side principal plane thereof are xm=7.34 xu=12.31 and these values satisfy the aforementioned conditional expression (1) (xm≦dx≦xu).

Figure 11:
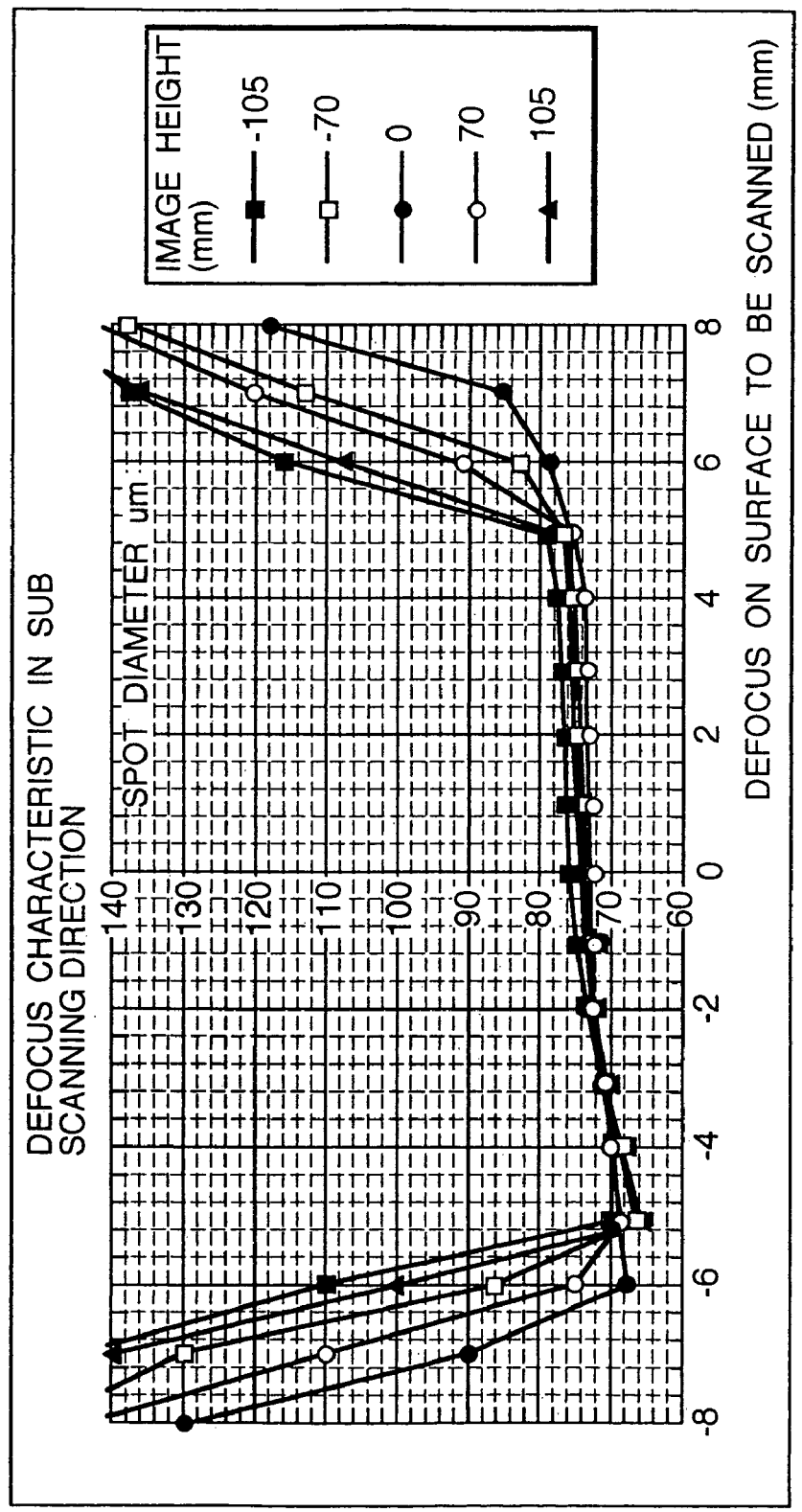
FIG. 11 is an illustration showing the defocus characteristic of a spot diameter in the sub scanning direction on a surface to be scanned in Embodiment 2 of the present invention.

Thereby, in Embodiment 2, as in the aforedescribed embodiment 1, the lateral magnification in the sub scanning direction between the light deflector 25 and the surface 8 to be scanned can be uniformized on the axis and off the axis to a level free of any practical problem, and as shown in FIG. 11, the change of the spot diameter in the sub scanning direction due to image height can be minimized. Thereby, there is achieved a scanning optical apparatus which is inexpensive and suitable for highly accurate printing.

In Embodiment 2, the divergent beam of light emitted from the semiconductor laser 1 is converted into a parallel beam of light by the collimator lens 2 as previously described and therefore, the jitter by the light deflector is null, and the lens shape, in the main scanning direction, of the lens surface R2 preponderantly creating the power in the sub scanning direction is similar to the shape of the locus of the principal plane for uniformizing the lateral magnification and therefore, the lateral magnification can be uniformized even if the change of curvature in the meridian-line direction due to image height is small, whereby there can be achieved a scanning optical apparatus suitable for further highly accurate printing.

Figure 12A:
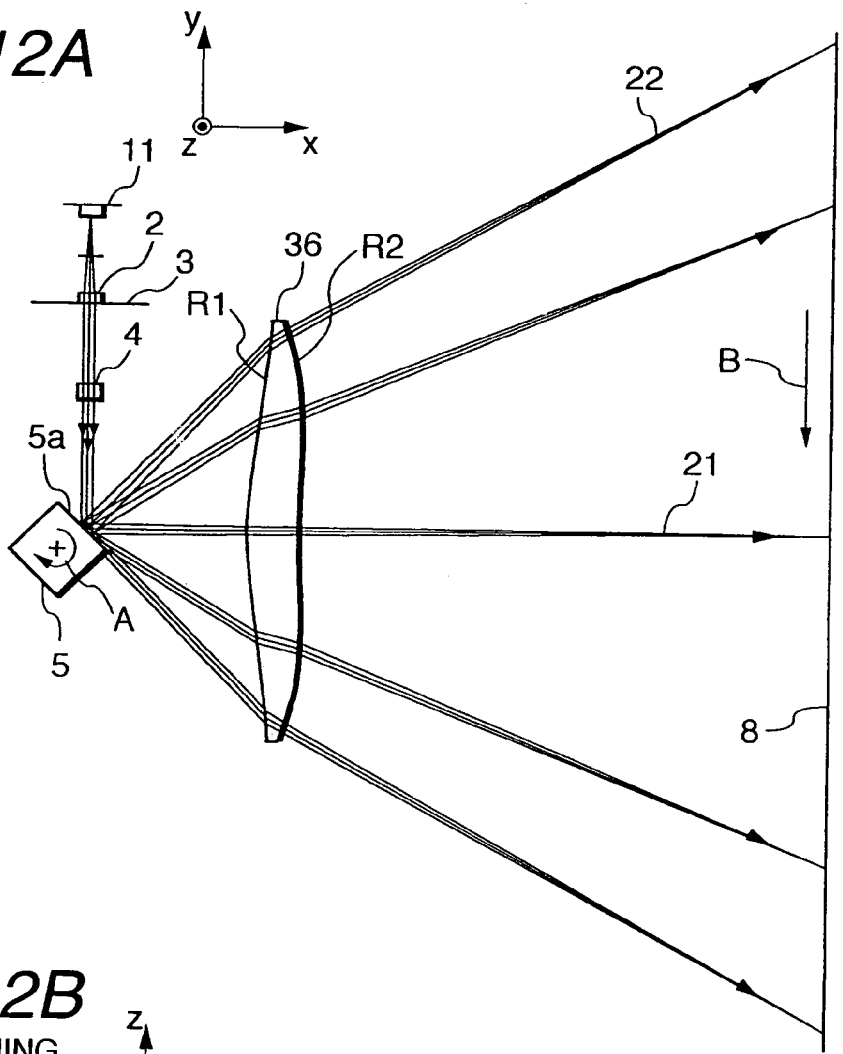
FIGS. 12A and 12B are cross-sectional views of the essential portions of Embodiment 3 of the present invention in the main scanning direction and the sub scanning direction, respectively.
Figure 12B:
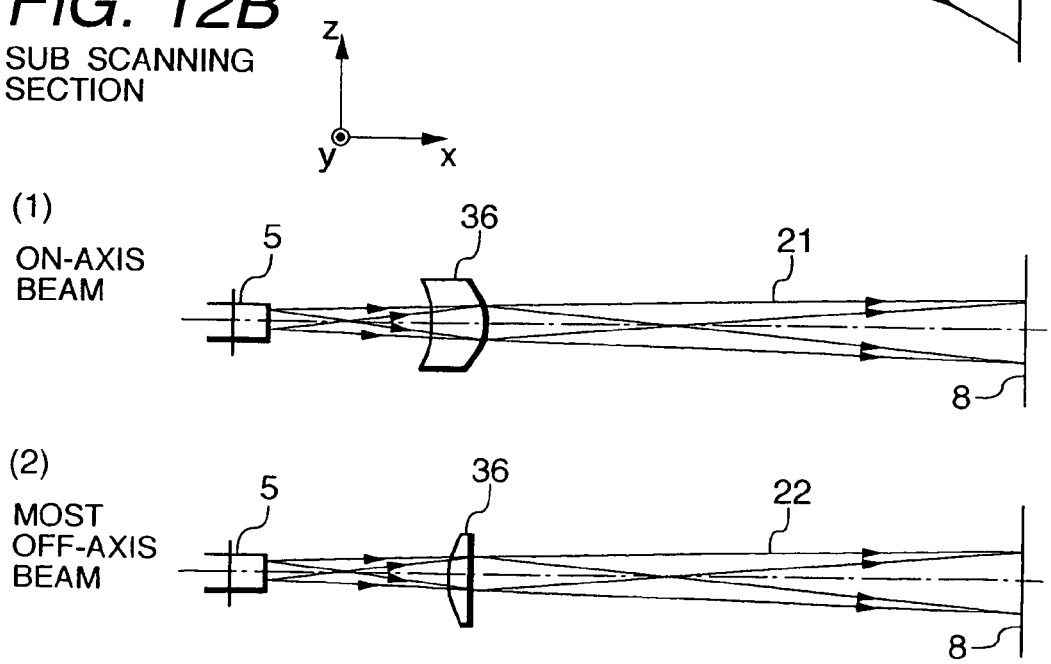

FIGS. 12A and 12B are cross-sectional views of Embodiment 3 of the present invention in the main scanning direction and the sub scanning direction, respectively. In these figures, the same element as the elements shown in FIG. 4 are given the same reference numerals.

The differences of Embodiment 3 from the aforedescribed Embodiment 1 are that the apparatus is comprised of a multibeam scanning optical system for scanning a plurality of beams of light emitted from light source means 11 having a plurality of (in Embodiment 3, too) light source units capable of being independently modulated, at a time, so as to have a predetermined interval therebetween on the surface to be scanned, and that correspondingly thereto, the lens shape of the fθ lens in the meridian-line direction (the sub scanning direction) is made different. In the other points, the construction and optical action of Embodiment 3 are substantially similar to those of the aforedescribed Embodiment 1, whereby a similar effect is obtained. The above-described plurality of light source units are disposed at a predetermined interval in the sub scanning direction.

Table 3 below shows the optical arrangement in Embodiment 3 and the aspherical surface coefficients of the fθ lens 36.

TABLE 3

(Embodiment 3)

| | | | | | shape of fθ lens | |
|---|---|---|---|---|---|---|
| | | | | | 1st surface | 2nd surface |
| wavelength used | λ(nm) | 780 | | | | |
| refractive index of fθ lens | n | 1.519 | R | | 6.78148+01 | 1.6154E+02 |
| angle of incidence on polygon | θi | −90 | K | | −1.6787E+01 | −1.0814E+02 |
| maximum angle of emergence from polygon | θmax | 45 | B4 | | −9.8604E−07 | −2.2909E−06 |
| polygon − fθ lens | e | 36 | B6 | | 1.5479E−11 | 7.1426E−10 |
| center thickness of fθ lens | d | 11 | B8 | | 8.7055E−14 | −3.2030E−13 |
| fθ lens − surface to be scanned | Sk | 110.5 | B10 | | −4.7942E−18 | 7.9836E−17 |
| maximum effective diameter of fθ lens | Ymax | 42 | r | | −2.8363E+01 | −1.1966E+01 |
| focal length of fθ lens | ft | 213.7 | d2S | | 5.4992E−05 | 4.4462E−05 |
| degree of convergence of collimator polygon − natural converging point | fc | 317.3 | d4S | | −2.2581E−08 | −2.7866E−08 |
| | | | d6S | | 9.5892E−12 | 2.5295E−11 |
| | | | d8S | | −1.9648E−15 | −1.0163E−14 |

TABLE 3-continued (Embodiment 3)

| | | shape of fθ lens | |
|---|---|---|---|
| | | 1st surface | 2nd surface |
| | d10S | 2.7992E−19 | 1.9816E−18 |
| | d2E | 4.3102E−05 | 3.9194E−05 |
| | d4E | 1.7579E−08 | −1.2704E−08 |
| | d6E | −3.6419E−11 | 1.1605E−11 |
| | d8E | 2.1285E−14 | −3.3827E−15 |
| | d10E | −4.6427E−18 | 8.2100E−20 |

In Embodiment 3, the lens shape of at least one of the lens surfaces of the fθ lens 36 in the meridian-line direction is set so that the sign of curvature may be reversed from on the on-axis toward the off-axis. Therefore, the meridian-line direction of the fθ lens 36 corresponding to the sub scanning direction is represented by the following expression:

$$S = \frac{Z^2/r'}{1 + (1 - (Z/r')^2)^{1/2}},$$ (e)

where $r' = r + d_2 Y^2 + d_4 Y^4 + d_6 Y^6 + d_8 Y^8 + d_{10} Y^{10}$. Also, the generating-line direction corresponding to the main scanning direction is represented by expression (c) as in the aforedescribed Embodiment 1.

Figure 13:
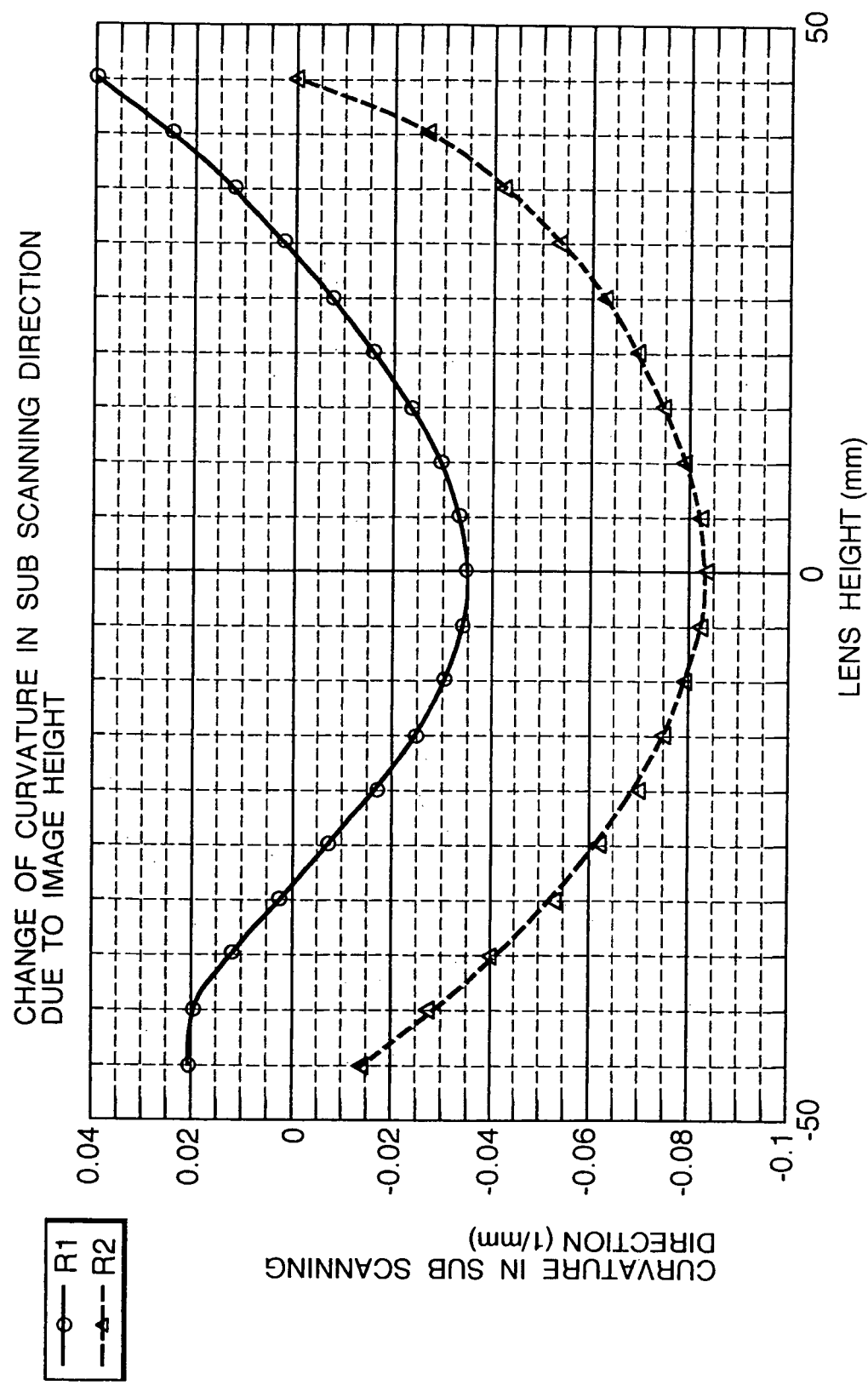
FIG. 13 is an illustration showing the aspherical surface shape of an fθ lens in Embodiment 3 of the present invention.
Figure 14:
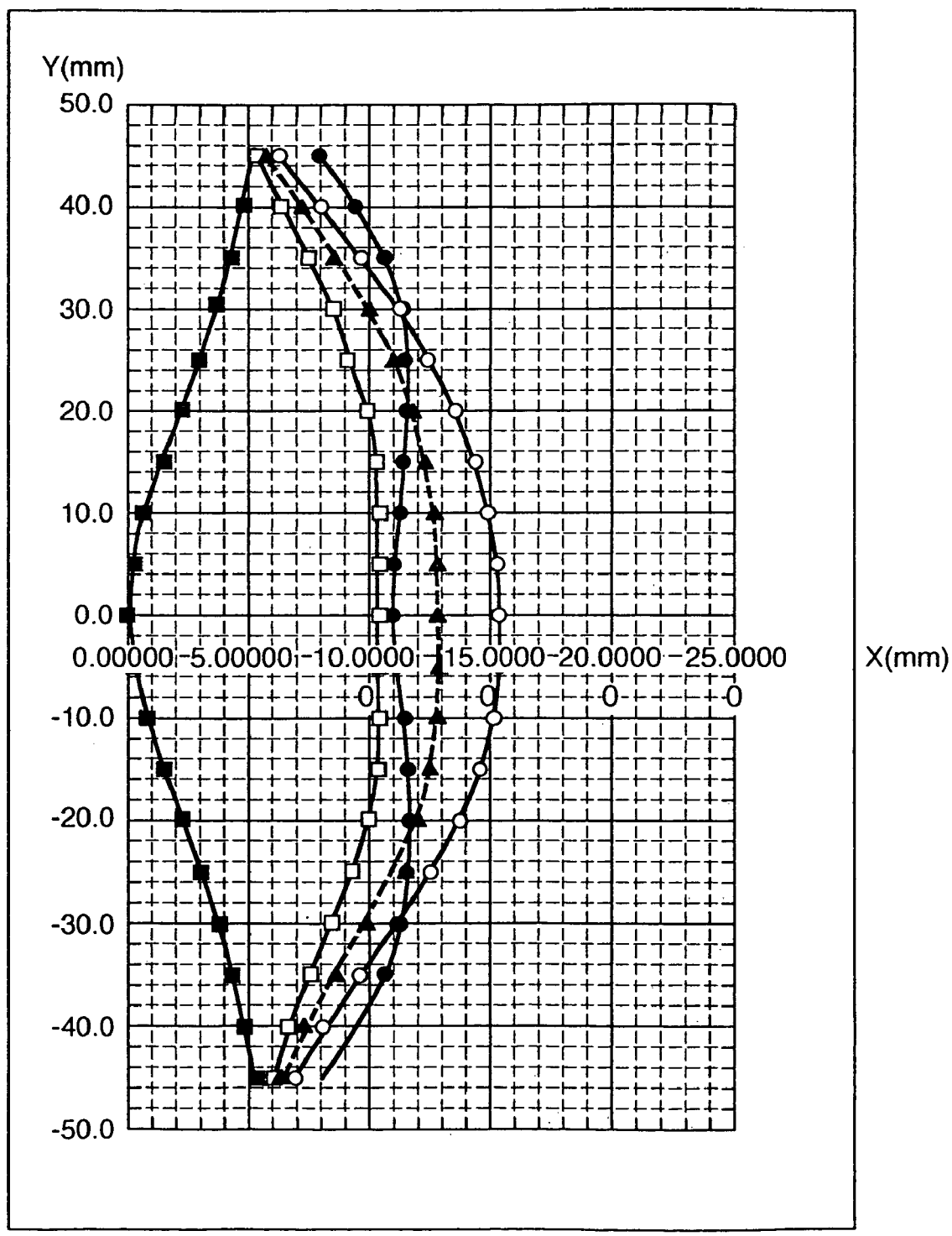
FIG. 14 is an illustration showing the shape of the fθ lens in the main scanning direction in Embodiment 3 of the present invention.

FIG. 13 is an illustration showing a change of curvature in the sub scanning direction relative to the position of the fθ lens 36 in Embodiment 3 in the lengthwise direction. As shown in FIG. 13, on the lens surface R1, the sign of curvature in the sub scanning direction is reversed from on the on-axis toward the off-axis, and the meniscus shape on the axis changes into a biconvex shape off the axis. FIG. 14 is an illustration showing the aspherical surface shape of the fθ lens 36. In FIG. 14, thick solid lines indicate the lens surface shape in the main scanning direction, and thin solid lines are the loci of the principal plane in the sub scanning direction, and indicate the front side principal plane and the rear side principal plane.

In Embodiment 3, the curve amount dx of the locus of the principal plane for suppressing the change of lateral magnification in the sub scanning direction due to image height is dx=6.50 from

Ppri=48.73 Epri=108.77

θpor=44.4° θimg=29.10°.

Also, the curve amount xm of the locus of the front side principal plane of the fθ lens 36 in the sub scanning direction and the curve amount xu of the locus of the rear side principal plane thereof are xm=4.93 xu=9.10 and these values satisfy the aforementioned conditional expression (1) (xm≦dx≦xu).

Thus, in Embodiment 3, as in the aforedescribed Embodiments 1 and 2, the lateral magnification in the sub scanning direction between the light deflector 5 and the surface 8 to be scanned can be uniformized to a level free of any practical problem on the axis and off the axis, and the change of the spot diameter in the sub scanning direction due to image height can be minimized. Thereby, there is achieved a scanning optical apparatus which is inexpensive and suitable for highly accurate printing.

Also, Embodiment 3 is a multibeam scanning optical apparatus using a plurality of beams of light to scan the surface to be scanned at a time and therefore, the curve of the scanning line provides pitch irregularity on the image and this is not good.

Figure 15:
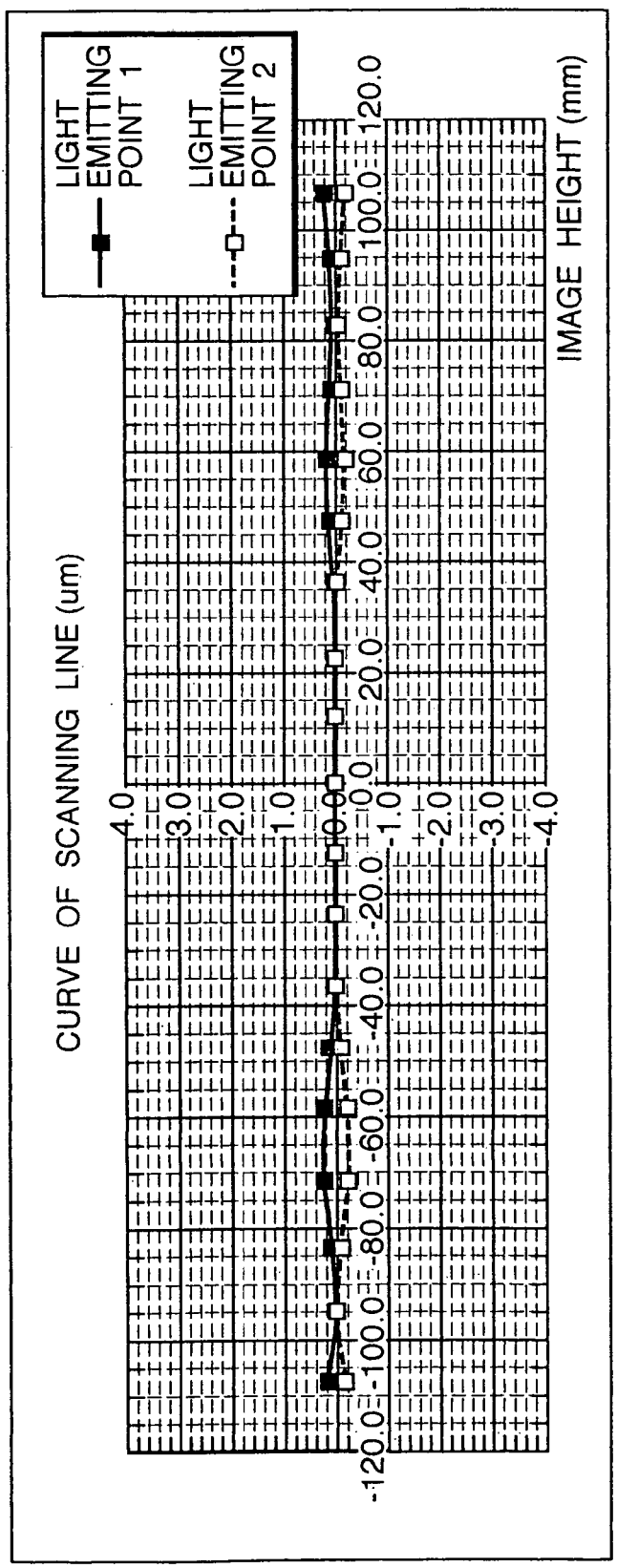
FIG. 15 is an illustration showing the curve of a scanning line in Embodiment 3 of the present invention.

So, in Embodiment 3, the radius of curvature in the sub scanning direction is continuously varied in the effective portion of the lens by image height, whereby the curve of the scanning line on the surface to be scanned can be eliminated as shown in FIG. 15, and thus, there is achieved a scanning optical apparatus (multibeam scanning optical apparatus) of high image quality free of pitch irregularity.

Figure 16A:
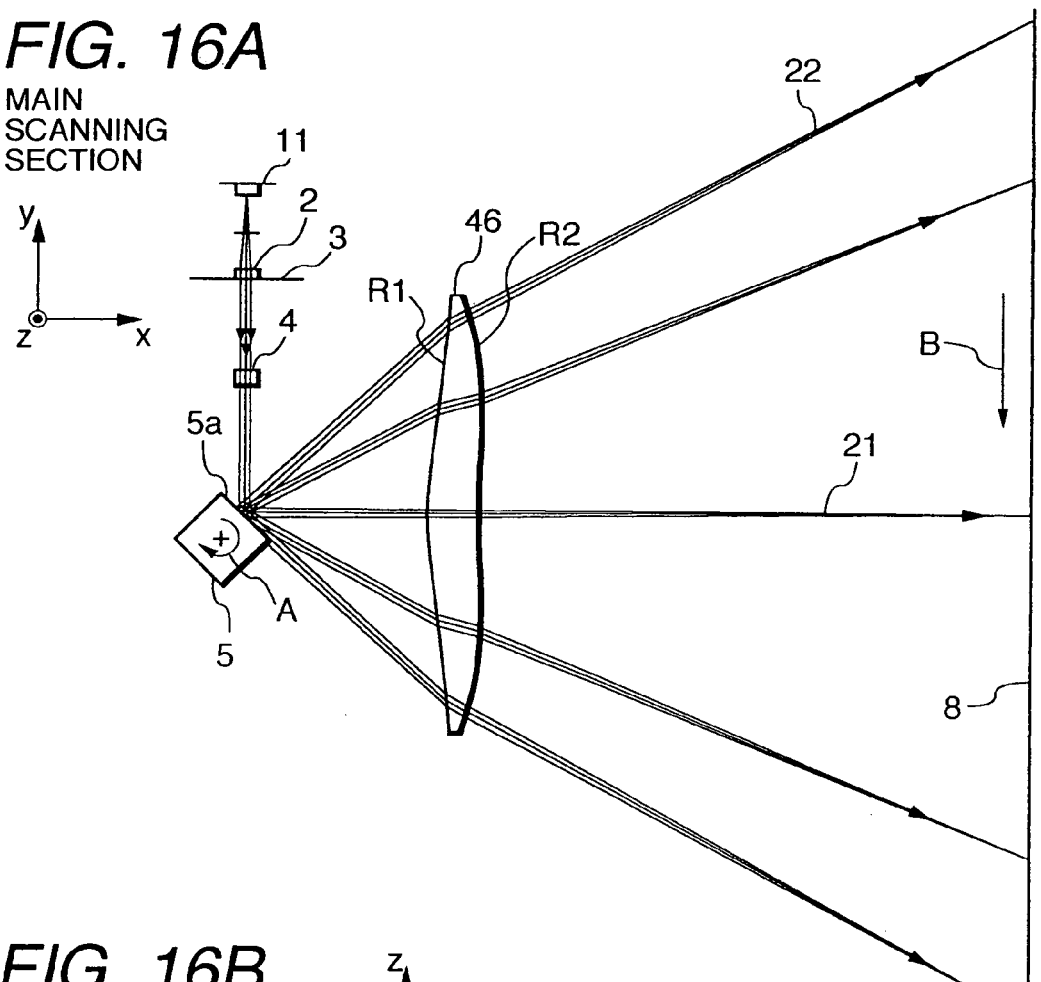
FIGS. 16A and 16B are cross-sectional views of the essential portions of Embodiment 4 of the present invention in the main scanning direction and the sub scanning direction, respectively.
Figure 16B:
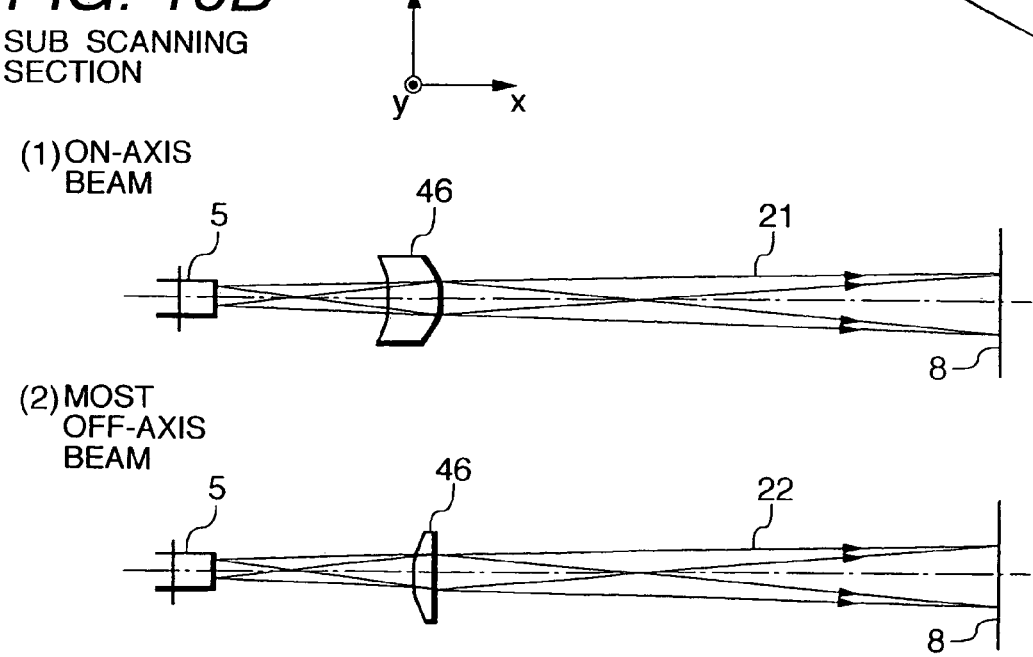

FIGS. 16A and 16B are cross-sectional views of the essential portions of Embodiment 4 of the present invention in the main scanning direction and the sub scanning direction, respectively. In these figures, the same element as the elements shown in FIGS. 12A and 12B are given the same reference numerals.

In FIGS. 16A and 16B, reference numeral 46 designates an fθ lens (an imaging optical system) comprising a lens having the fθ characteristic as a third optical element, and this fθ lens 46 is disposed more toward the light deflector 5 than the intermediate portion between the light deflector 5 and the photosensitive drum surface 8 as the surface to be scanned.

In Embodiment 4, the opposite lens surfaces of the fθ lens 46 both have their curvatures in the sub scanning direction continuously varied from the on-axis fθ lens 46 both have their curvatures in the sub scanning direction continuously varied from the on-axis toward the off-axis. Thereby, in Embodiment 4, the change of F number in the sub scanning direction due to the image height of the beam of light incident on the surface to be scanned, i.e., the change of the spot diameter, is minimized. Also, the sign of the curvature of at least one (the first surface) R1 of the opposite lens surfaces of the fθ lens 46 in the sub scanning direction is reversed from the on-axis toward the off-axis. Further, the curvatures of the opposite lens surfaces of the fθ lens in the sub scanning direction are varied from the on-axis toward the off-axis so as to become asymmetrical with respect to the optical axis. The fθ lens 46 causes a plurality of beams of light based on image information deflected and reflected by the light deflector 5 to be imaged on the photosensitive drum surface 8 and corrects the plane inclination of the deflecting surface of the light deflector 5.

In Embodiment 4, the fθ lens 46 may be made by plastic molding or may be made by glass molding.

In Embodiment 4, two independently modulated divergent beams of light emitted from a semiconductor laser 11 are converted into convergent beams of light by the collimator lens 2, and these beams of light (the quantity of light) are limited by the aperture stop 3 and enter the cylindrical lens 4. The beams of light having entered the cylindrical lens 4, in the main scanning section, emerge therefrom intactly in that state. Also, in the sub scanning section, they converge and are imaged as substantially linear images (linear images long in the main scanning direction) on the deflecting surface 5a of the light deflector 5. The two beams of light deflected and reflected by the deflecting surface 5a of the light deflector 5 from two spots on the photosensitive drum surface 8 through the fθ lens 46 having different refractive powers in the main scanning direction and the sub scanning direction, and scan the photosensitive drum surface 8 in the direction of arrow B by the light deflector 5 being rotated in the direction of arrow A. Thereby, image recording is effected.

In Embodiment 4, the lens shape of the fθ lens 46, in the main scanning direction, is made into an aspherical surface shape capable of being represented by a function up to the 10th order in the main scanning direction and in the sub scanning direction, is comprised of a spherical surface continuously varying in the image height direction. That lens shape is such that the generating-line direction corresponding to the main scanning direction is indicated by the aforementioned expression (c) and the meridian-line direction corresponding to the sub scanning direction (the direction orthogonal to the main scanning direction containing the optical axis of the fθ lens) can be represented by $$S = \frac{Z^2/r'}{1 + (1 - (Z/r')^2)^{1/2}}, \quad (f)$$

(where $1/r' = 1/r + D_2 Y^2 + D_4 Y^4 + D_6 Y^6 + D_8 Y^8 + D_{10} Y^{10}$).

Generally, in a multibeam scanning optical apparatus, to make pitch irregularity visually inconspicuous, it is desirable that the pitch irregularity due to the curve of the scanning line be 1/10 of the beam pitch in the sub scanning direction or less. For example, in the case of a scanning optical apparatus in which the resolution in the sub scanning direction is 600 dpi, the beam pitch in the sub scanning direction is 42 μm and therefore, allowable pitch irregularity is about 4 μm or less.

So, in Embodiment 4, when the maximum value and the minimum value of the F number of the beam of light incident on the surface to be scanned in the sub scanning direction are Fmax and Fmin, respectively, the curvatures of the opposite lens surfaces of the fθ lens 46 in the sub scanning direction are continuously varied from the on-axis toward the off-axis so as to satisfy the condition that $$F\text{min}/F\text{max} \geq 0.9, \quad (2)$$

whereby the curve of the scanning line can be eliminated to thereby achieve a multibeam scanning optical apparatus which suffers little from pitch irregularity and is high in image quality and compact.

If the above-mentioned condition is departed from, pitch irregularity will become visually conspicuous due to the curve of the scanning line and this will pose a problem in practice.

Table 4 below shows the optical arrangement in Embodiment 4 and the aspherical surface coefficients of the fθ lens 46.

TABLE 4

(Embodiment 4)

| Design Data | | | shape of fθ lens | |
|---|---|---|---|---|
| | | | 1st surface | 2nd surface |
| wavelength used | λ(nm) | 780 | R | 6.7814E+01 | 1.6154E+02 |
| refractive index of fθ lens | n | 1.519 | K | −1.6787E+01 | −1.0814E+02 |
| angle of incidence on polygon | θi | −90 | B4 | −9.8604E−07 | −2.2909E−06 |
| maximum angle of emergence from polygon | θmax | 45 | B6 | 1.5479E−11 | 7.1426E−10 |
| polygon – fθ lens | e | 36 | B8 | 8.7055E−14 | −3.2030E−13 |
| center thickness of fθ lens | d | 11 | B10 | −4.7942E−18 | 7.9836E−17 |
| fθ lens – surface to be scanned | Sk | 110.5 | r | −2.8363E+01 | −1.1966E+01 |
| maximum effective diameter of fθ lens | Ymax | 42 | D2S | 5.4992E−05 | 4.4462E−05 |
| focal length of fθ lens | ft | 213.7 | D4S | −2.2581E−08 | −2.7866E−08 |
| degree of convergence of collimator | fc | 317.3 | D6S | 9.5892E−12 | 2.5295E−11 |
| polygon – natural converging point | | | D8S | −1.9648E−15 | −1.0163E−14 |
| polygon | circumscribed circle ϕ20 4 surfaces | | D10S | 2.7992E−19 | 1.9816E−18 |
| | | | D2E | 4.3102E−05 | 3.9194E−05 |
| | | | D4E | 1.7579E−08 | −1.2704E−08 |
| | | | D6E | −3.6419E−11 | 1.1605E−11 |
| | | | D8E | 2.1285E−14 | −3.3827E−15 |
| | | | D10E | −4.6427E−18 | 8.2100E−20 |

Figure 17:
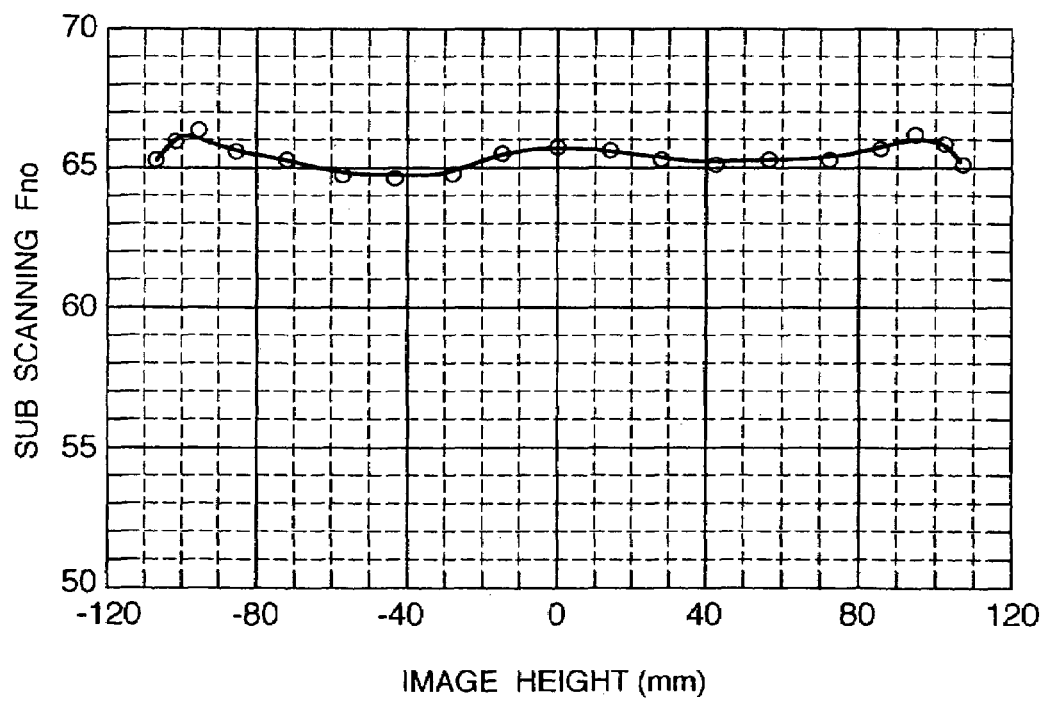
FIG. 17 is an illustration showing a change in F number in the sub scanning direction on a surface to be scanned relative to image height in Embodiment 4 of the present invention.
Figure 18:
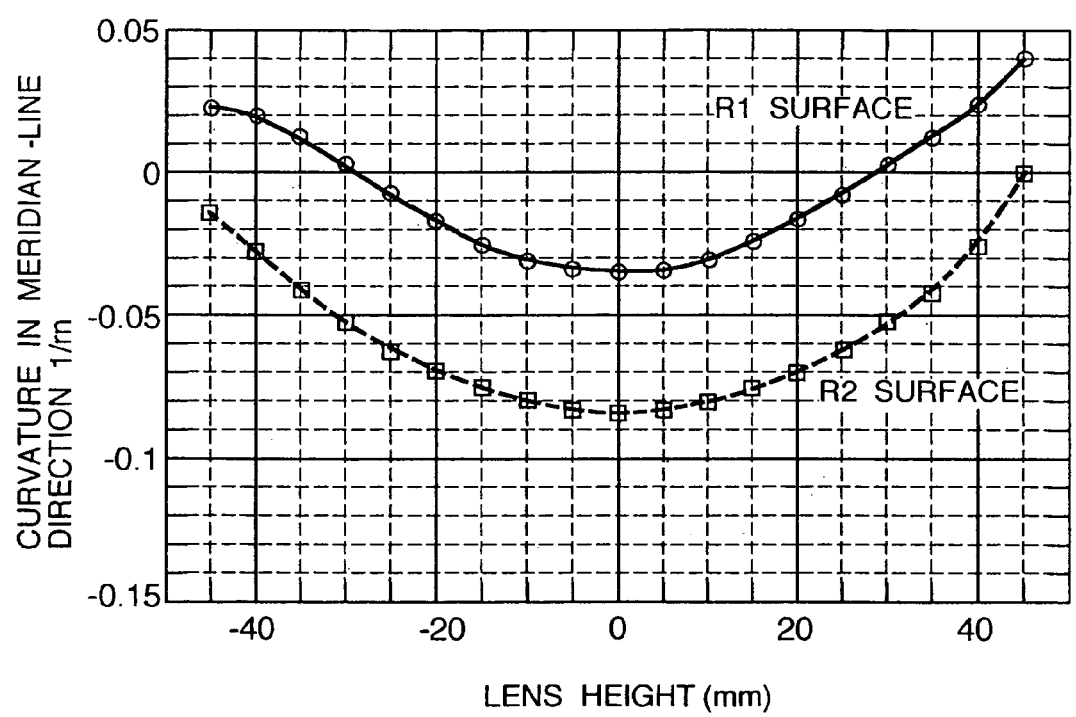
FIG. 18 is an illustration showing the curvature of an fθ lens in the meridian-line direction relative to image height in Embodiment 4 of the present invention.

FIG. 17 is an illustration showing a change of F number in the sub scanning direction on the surface to be scanned in Embodiment 4. In Embodiment 4, the curvatures of the fθ lens 46 in the sub scanning direction are continuously varied on the opposite lens surfaces from the on-axis toward the off-axis as shown in FIG. 18 to thereby suppress the rate of change of F number due to image height so as to be $$F\text{min}/F\text{max} = 64.52/66.31 = 0.973,$$

i.e., 0.9 or greater.

Figure 19:
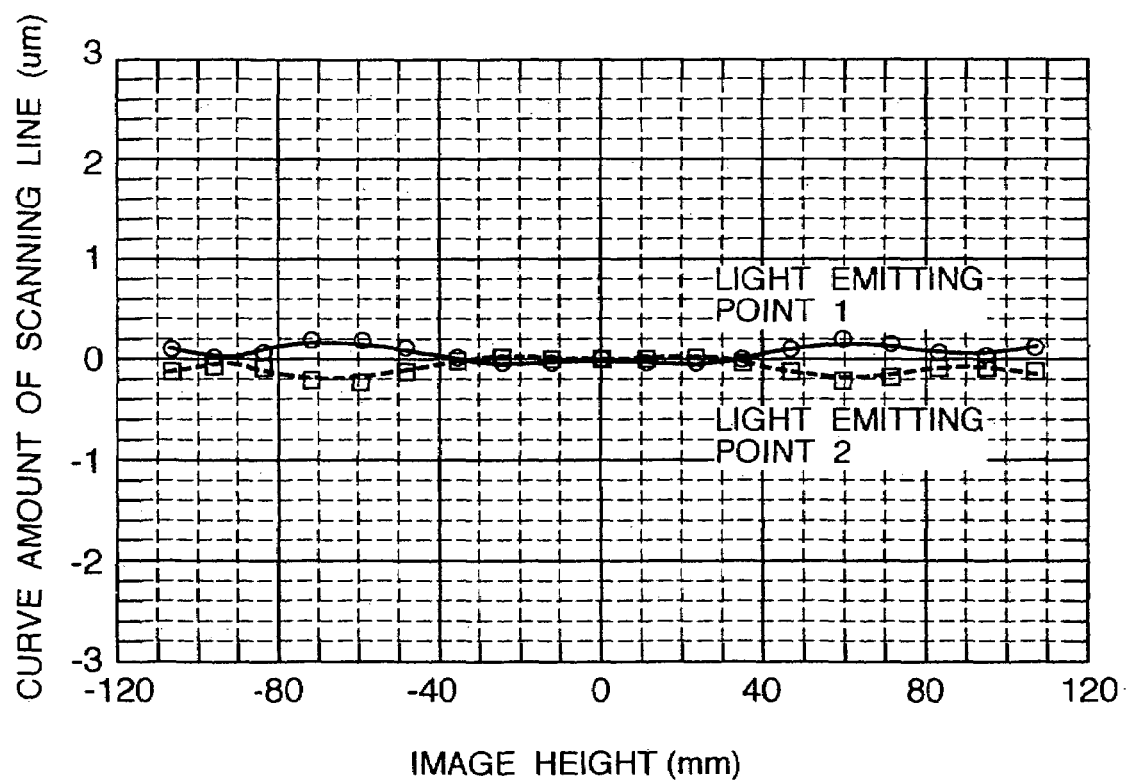
FIG. 19 is an illustration showing the curvature of a scanning line during multibeam scanning at resolution 600 dpi (scanning line interval 42.3 μm) in Embodiment 4 of the present invention.

FIG. 19 is an illustration showing the curve of the scanning line when the multibeam scanning optical apparatus of Embodiment 4 is used at resolution 600 dpi (scanning line interval 42.3 μm). By suppressing the change of F number due to image height as described above, the curve of the scanning line can be brought to a level of the order of 0.2 μm (pitch irregularity being of the order of 0.4 μm) which is quite free of a practical problem.

Thus, in Embodiment 4, as described above, conditional expression (2) is satisfied and yet the curvatures of the fθ lens 46 in the sub scanning direction (the meridian-line direction) are continuously varied from the on-axis toward the off-axis to thereby suppress the change of F number in the sub scanning direction due to image height, i.e., the change of the spot diameter, to below a predetermined amount (within the allowable value of the apparatus) and eliminate the pitch irregularity due to the curve of the scanning line which poses a problem in the multibeam scanning optical apparatus. Also, in Embodiment 4, the third optical element (fθ lens) 46 is comprised of a single lens and therefore, there can be achieved a compact and low-cost multibeam scanning optical apparatus.

Figure 20A:
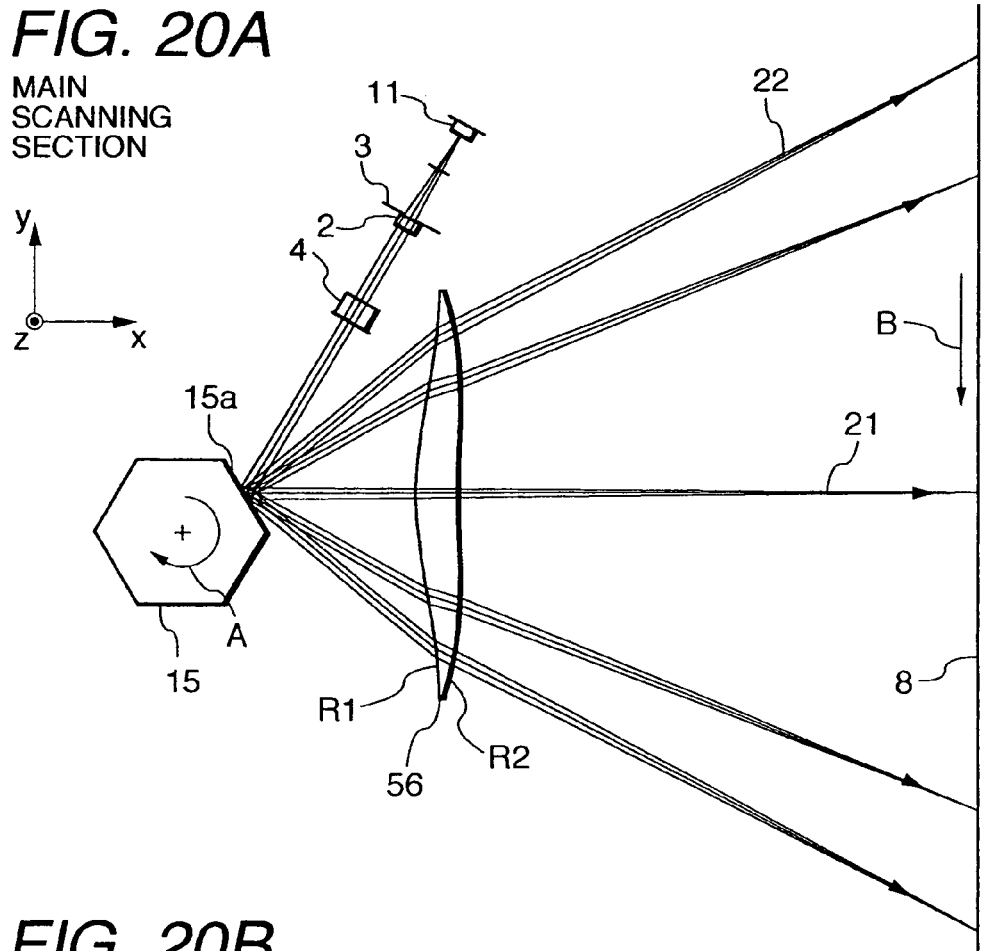
FIGS. 20A and 20B are cross-sectional views of the essential portions of Embodiment 5 of the present invention in the main scanning direction and the sub scanning direction, respectively.
Figure 20B:
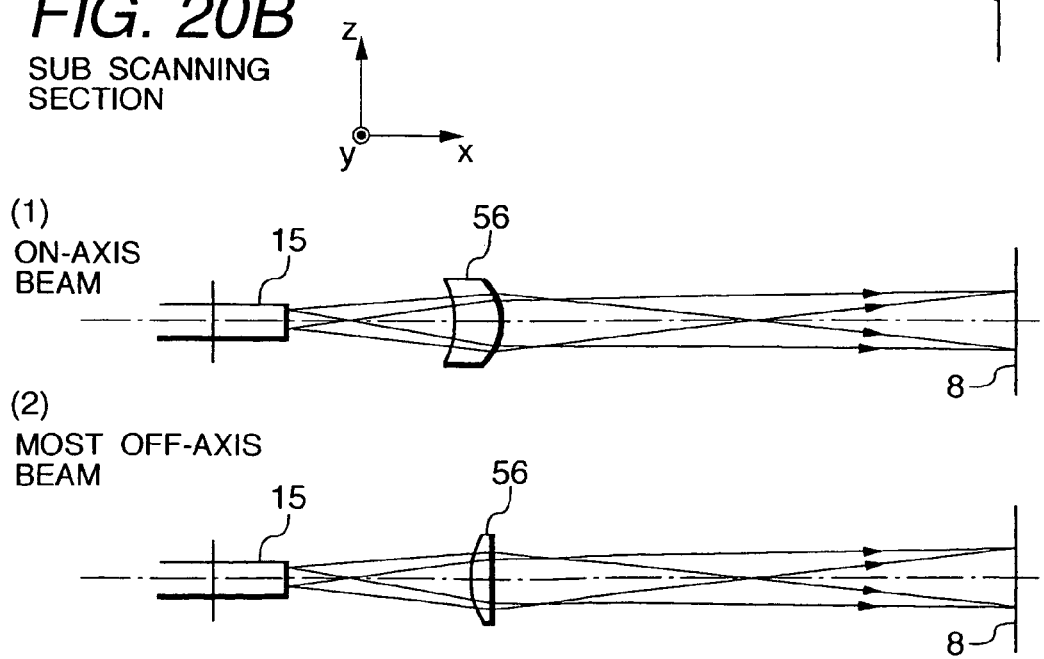

FIGS. 20A and 20B are cross-sectional views of the essential portions of Embodiment 5 of the present invention in the main scanning direction and the sub scanning direction, respectively. In these figures, the same elements as the elements shown in FIGS. 12A and 12B are given the same reference numerals.

The differences of Embodiment 5 from the aforedescribed Embodiment 4 are that in order to make curvature of image field in the main scanning direction small so as to be capable of coping with further highly accurate printing, the curvatures of the opposite lens surfaces of an fθ lens 56 in the generating-line direction are set so as to be asymmetrical with the optical axis, and that the number of the polygon surfaces of the polygon mirror 15 is changed from four to six to thereby cope with high-speed printing. In the other points, the construction and optical action of Embodiment 5 are substantially similar to those of Embodiment 4, whereby a similar effect is obtained.

Table 5 below shows the optical arrangement in Embodiment 5 and the aspherical surface coefficients of the fθ lens 56.

interval 42.3 μm). By suppressing the change of F number due to image height as described above, the curve of the scanning line can be brought to a level of the order of 1.2 μm (the pitch irregularity being of the order of 2.4 μm) quite free of a practical problem.

Thus, again in Embodiment 5, as in Embodiment 4, conditional expression (2) is satisfied and yet the curvatures of the opposite lens surfaces of the fθ lens 56 in the sub scanning direction (the meridian-line direction) are continuously varied from the on-axis toward the off-axis to thereby suppress the change of F number in the sub scanning direction due to image height, i.e., the change of the spot diameter, to below a predetermined amount, and eliminate the pitch irregularity due to the curve of the scanning line which poses a problem in the multibeam scanning optical apparatus. Also, in Embodiment 5, the curvatures of the opposite lens surfaces of the fθ lens (the third optical element) 56 in the generating-line direction are set so as to be asymmetrical with respect to the optical axis to thereby suppress the curvature of image field in the main scanning direction and achieve a multibeam scanning optical apparatus suitable for further highly accurate printing.

FIGS. 24A and 24B are cross-sectional views of the essential portions of Embodiment 6 of the present invention in the main scanning direction and the sub scanning direction, respectively. In these figures, the same element as the elements shown in FIGS. 12A and 12B are given the same reference numerals.

TABLE 5

(Embodiment 5)

| Design Data | | | shape of fθ lens | | |
|---|---|---|---|---|---|
| | | | | 1st surface | 2nd surface |
| wavelength used | λ(nm) | 780 | R | 7.6014E+01 | 1.8577E+02 |
| refractive index of fθ lens | n | 1.524 | K | −1.4188E+01 | −9.3624E+01 |
| angle of incidence on polygon | θi | −60 | B4S | −8.8268E−07 | −1.6683E−06 |
| maximum angle of emergence from polygon | θmax | 41.0 | B6S | 8.8566E−11 | 3.5647E−10 |
| polygon – fθ lens | e | 41.1 | B8S | 4.0586E−14 | −1.2120E−13 |
| center thickness of fθ lens | d | 10.4 | B10S | −5.2861E−19 | 3.5062E−17 |
| fθ lens – surface to be scanned | Sk | 122.5 | B4E | −8.8268E−07 | −1.6683E−06 |
| maximum effective diameter of fθ lens | Ymax | 42 | B6E | 5.2038E−11 | 3.5647E−10 |
| focal length of fθ lens | ft | 237.7 | B8E | 6.4399E−14 | −1.2120E−13 |
| degree of convergence of collimator | fc | 339.69 | B10E | −5.1518E−18 | 3.5062E−17 |
| polygon – natural converging point | | | r | −3.0459E+01 | −1.3017E+01 |
| polygon | | circumscribed circle φ40 6 surfaces | D2S | −3.2380E−05 | −1.4111E−06 |
| | | | D4S | 7.6080E−08 | 1.0715E−09 |
| | | | D6S | −3.4870E−11 | 1.7648E−11 |
| | | | D8S | 5.0570E−15 | −8.2750E−15 |
| | | | D10S | 0.0000E+00 | 1.0082E−18 |
| | | | D2E | −3.5200E−05 | −1.4111E−06 |
| | | | D4E | 8.0516E−08 | 1.0715E−09 |
| | | | D6E | −3.8015E−11 | 1.7648E−11 |
| | | | D8E | 6.0665E−15 | −8.2750E−15 |
| | | | D10E | −1.1908E−19 | 1.0082E−18 |

Figure 21:
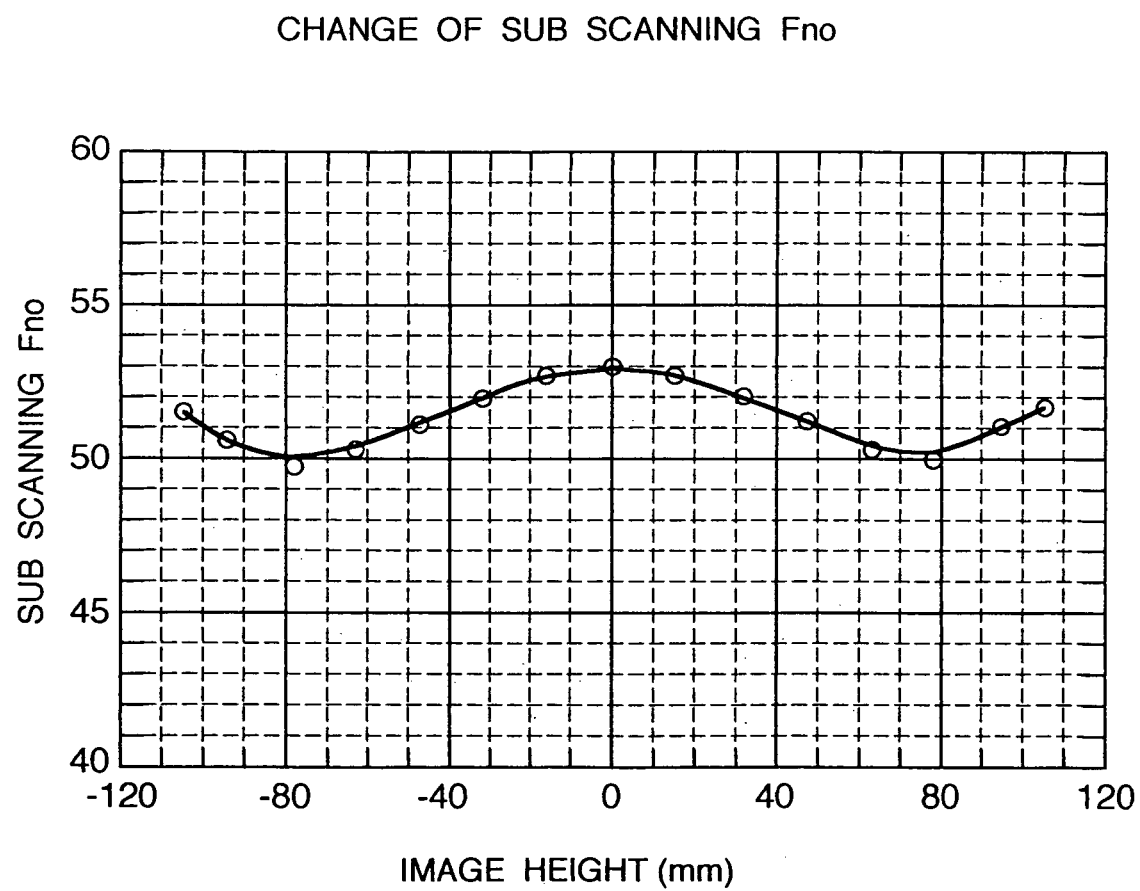
FIG. 21 is an illustration showing a change of F number in the sub scanning direction on a surface to be scanned relative to image height in Embodiment 5 of the present invention.
Figure 22:
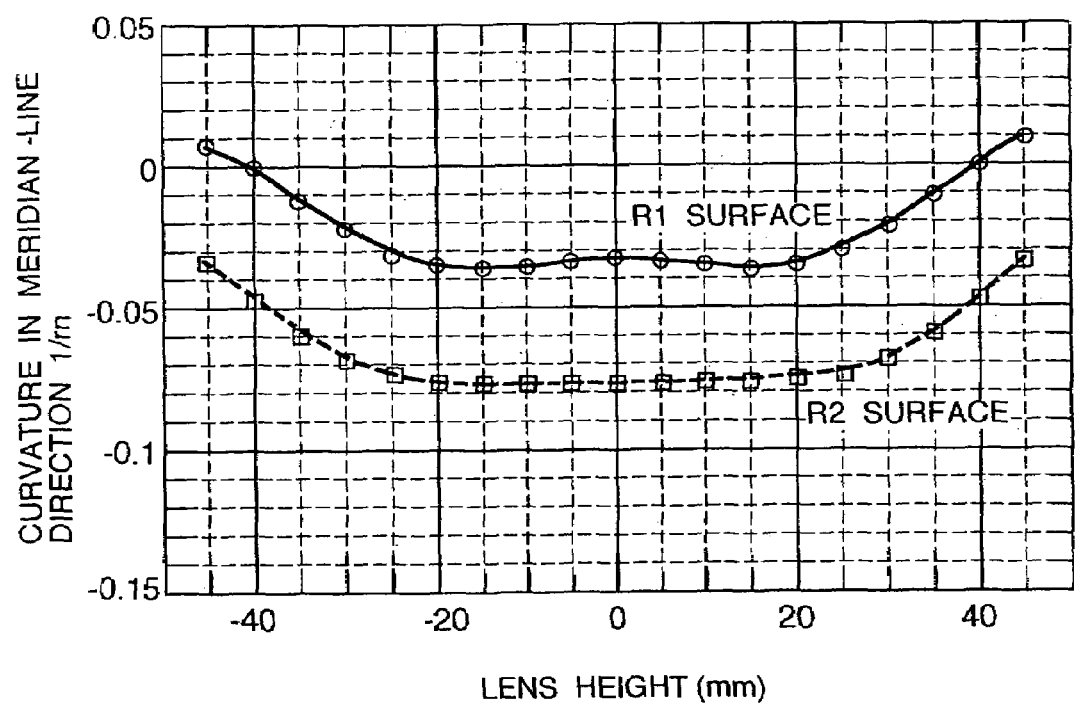
FIG. 22 is an illustration showing the curvature of an fθ lens in the meridian-line direction relative to image height in Embodiment 5 of the present invention.

FIG. 21 is an illustration showing a change of F number in the sub scanning direction on the surface to be scanned in Embodiment 5. In Embodiment 5, the curvatures of the fθ lens 56 in the sub scanning direction are continuously varied on the opposite lens surfaces from the on-axis toward the off-axis as shown in FIG. 22, to thereby suppress the rate of change of F number due to image height so as to be Fmin/Fmax=49.75/53.08=0.937, i.e., 0.9 or greater.

Figure 23:
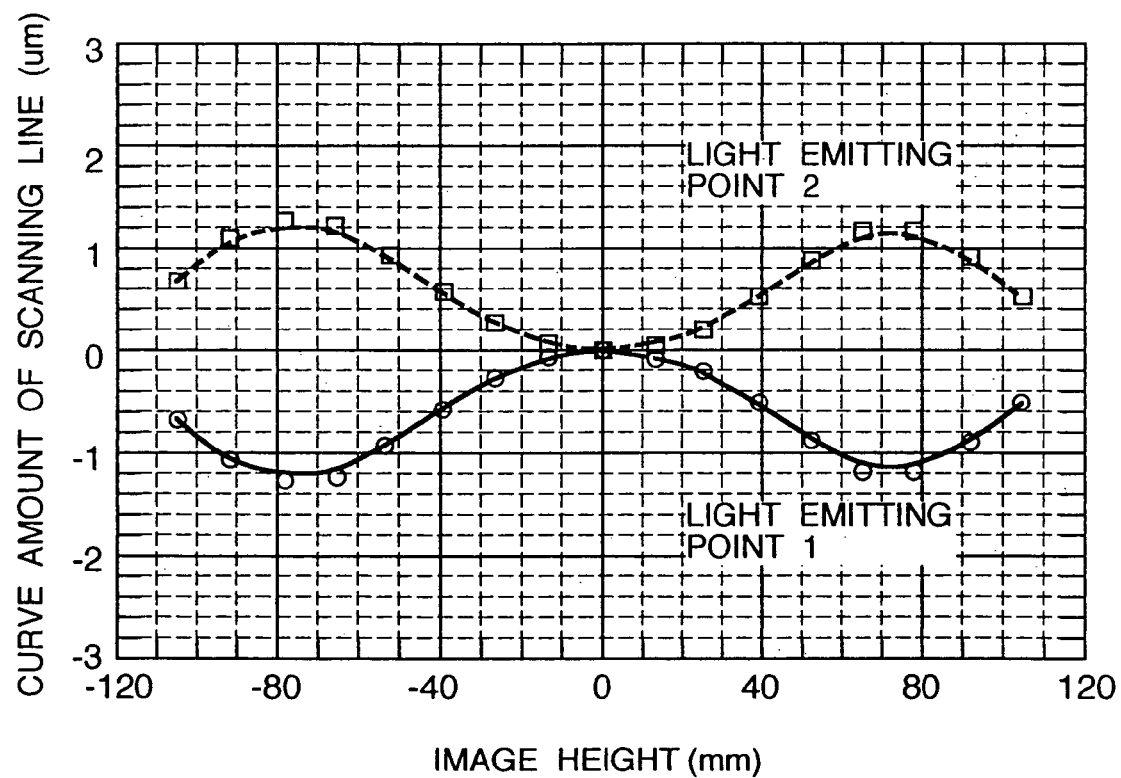
FIG. 23 is an illustration showing the curve of a scanning line during multibeam scanning at resolution 600 dpi (scanning line interval 42.3 μm) in Embodiment 5 of the present invention.

FIG. 23 is an illustration showing the curve of the scanning line when the multibeam scanning optical apparatus of Embodiment 5 is used at resolution 600 dpi (the scanning line The differences of Embodiment 6 from the aforedescribed Embodiment 4 are that an fθ lens (the third optical element) 76 is comprised of two lenses and the pitch irregularity due to the curve of the scanning line is reduced at higher accuracy, that the beam of light from a semiconductor laser 11 having a plurality of light emitting portions capable of being independently modulated is converted into a substantially parallel beam of light by the collimator lens 2, and that the number of the polygon surfaces of the polygon mirror 15 is changed from four to six to thereby cope with high-speed printing. In the other points, the construction and optical action of Embodiment 6 are substantially similar to those of the afore described Embodiment 4, whereby a similar effect is obtained.

That is, in FIGS. 24A and 24B, reference numeral 76 designates an fθ lens as a third optical element, which comprises two lenses, i.e., a spherical lens (glass spherical lens) 76a as a first fθ lens formed of a glass material, and a toric lens (aspherical plastic toric lens) 76b as a second fθ lens of an aspherical surface shape formed of a plastic material. The glass spherical lens 76a is disposed more toward the light deflector 15 than the intermediate portion between the light deflector 15 and the photosensitive drum surface 8 and has the function of correcting chiefly the fθ characteristic. The aspherical plastic toric lens 76b effects chiefly the correction of curvature of image field and the correction of lateral magnification in the sub scanning direction.

In Embodiment 6, the curvatures, in the meridian-line direction (the sub scanning direction), of the opposite lens surfaces of the aspherical plastic toric lens 76b bearing almost all of the refractive power in the sub scanning direction are continuously varied from the on-axis toward the off-axis to thereby suppress the change of F number in the sub scanning direction on the surface to be scanned, i.e., the change of the spot diameter.

Table 6 below shows the optical arrangement in Embodiment 6 and the aspherical surface coefficients of the fθ lens (spherical lens 76a and toric lens 76b) 76.

to a level of the order of 0.1 μm (pitch irregularity being of the order of 0.2 μm) free of a practical problem.

Thus, again in Embodiment 6, as in the aforedescribed Embodiment 4, conditional expression (2) is satisfied and yet the curvatures of the opposite lens surfaces of the toric lens 76b constituting the fθ lens 76 in the sub scanning direction (the meridian-line direction) are continuously varied from the on-axis toward the off-axis to thereby suppress the change of F number in the sub scanning direction due to height, i.e., the change of the spot diameter, to below a predetermined amount and eliminate the pitch irregularity due to the curve of the scanning line which poses a problem in the multibeam scanning optical apparatus. Also, in Embodiment 6, by the fθ lens (the third optical element) 76 being comprised of two lenses, the curve of the scanning line can be corrected more highly accurately, and there is achieved a multibeam scanning optical apparatus suitable for further highly accurate printing.

The sign of the curvature of at least one of the two lenses constituting the third optical element in the sub scanning direction may be reversed from the on-axis toward the off-axis, and the curvatures of at least two lens surfaces of the two lenses in the sub scanning direction may be varied asymmetrically with respect to the optical axis from the on-axis toward the off-axis. Thereby, there can be achieved a multibeam scanning optical apparatus more suitable for highly accurate printing.

TABLE 6

(Embodiment 6)

| Design Data | | | 1st surface | 2nd surface |
|---|---|---|---|---|
| | | | shape of 1st fθ lens | |
| wavelength used | λ(nm) | 780 | R ∞ | −1.2042E+02 |
| refractive index of 1st fθ lens | n1 | 1.786 | r ∞ | −1.2042E+02 |
| refractive index of 2nd fθ lens | n2 | 1.572 | | |
| angle of incidence on polygon | θi | 65 | shape of 2nd fθ lens | |
| maximum angle of emergence from polygon | θmax | 45 | R −8.7734E+02 | −3.4387E+02 |
| polygon – 1st fθ lens | e1 | 25.28 | K 0.0000E+00 | 0.0000E+00 |
| center thickness of 1st fθ lens | d1 | 14.00 | B4 −1.5203E−08 | 6.2830E−0.8 |
| focal length of 1st to 2nd fθ lens | e2 | 17.60 | B6 −1.2062E−11 | −1.5527E−11 |
| center thickness of 2nd fθ lens | d2 | 5.10 | r −1.2218E+01 | −9.9688E+00 |
| fθ lens – surface to be scanned | Sk | 116.13 | D2S −4.2145E−07 | 4.2877E−07 |
| maximum effective diameter of fθ lens | Ymax | 50 | D4S 1.3072E−10 | −7.9350E−10 |
| focal length of fθ lens | ft | 136 | D6S 6.7762E−13 | 7.0965E−13 |
| polygon | circumscribed circle φ40 6 surfaces | | D2E 2.2156E−07 | 1.2975E−07 |
| | | | D4E 1.2193E−11 | −2.2874E−10 |
| | | | D6E 4.9138E−13 | 4.3863E−13 |

Figure 25:
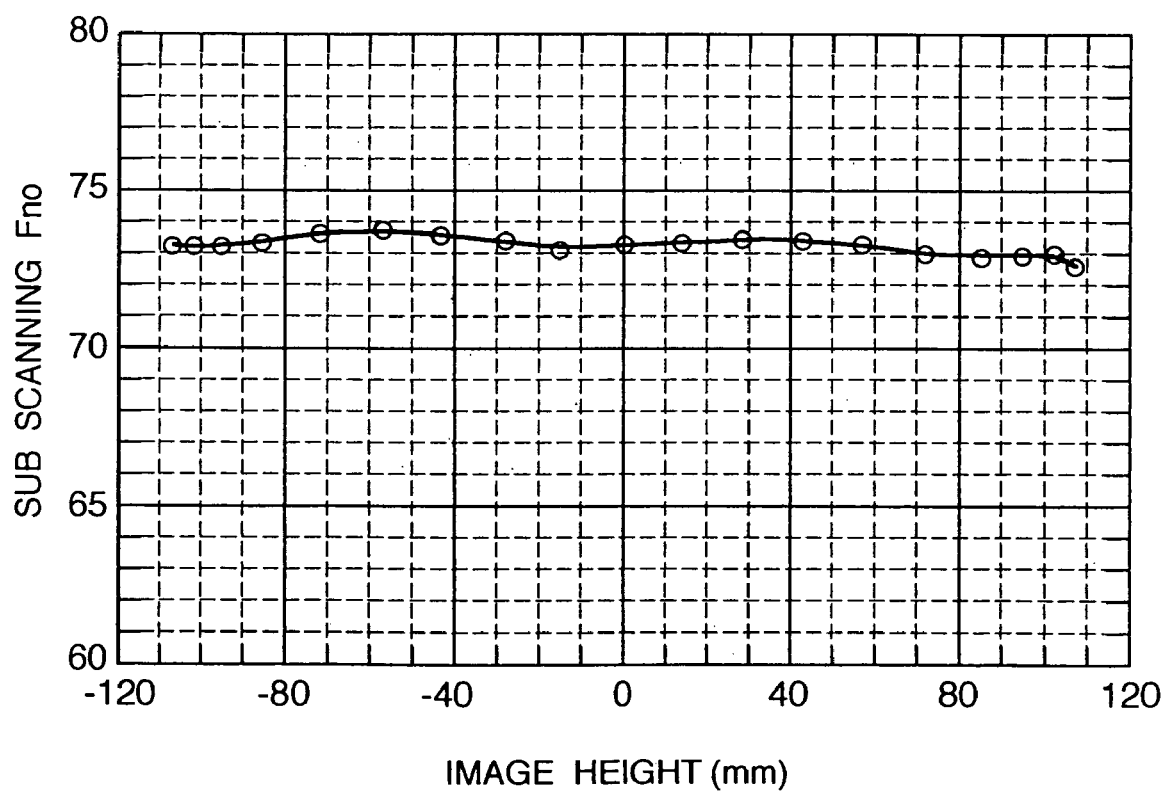
FIG. 25 is an illustration showing a change of F number in the sub scanning direction on a surface to be scanned relative to image height in Embodiment 6 of the present invention.
Figure 26:
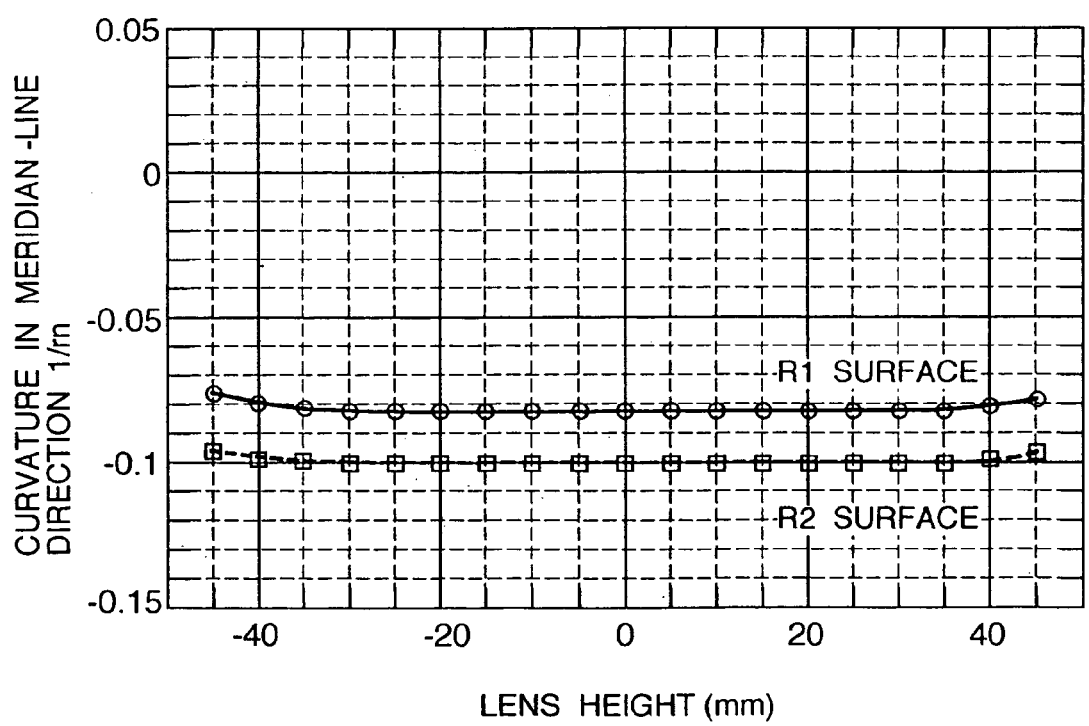
FIG. 26 is an illustration showing the curvature of an fθ lens in the meridian-line direction relative to image height in Embodiment 6 of the present invention.

FIG. 25 is an illustration showing a change of F number in the sub scanning direction on the surface to be scanned in Embodiment 6. In Embodiment 6, the curvatures of the toric lens 76b in the sub scanning direction are continuously varied on the opposite lens surfaces thereof from the on-axis toward the off-axis as shown in FIG. 26 to thereby suppress the rate of change of F number due to image height so as to be $Fmin/Fmax=72.67/73.75=0.985$, i.e., 0.9 or greater.

Figure 27:
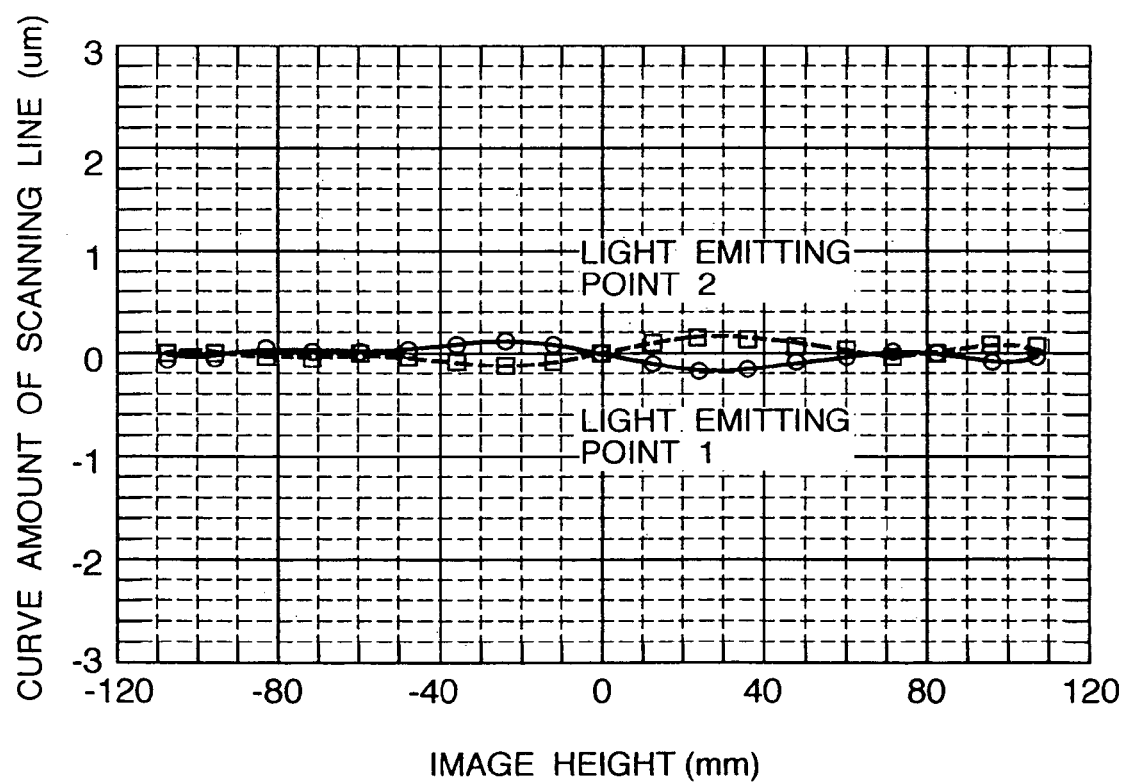
FIG. 27 is an illustration showing the curve of a scanning line during multibeam scanning at resolution 600 dpi (scanning line interval 42.3 μm) in Embodiment 6 of the present invention.

FIG. 27 is an illustration showing the curve of the scanning line when the multibeam scanning optical apparatus of Embodiment 6 is used at resolution 600 dpi (scanning line interval 42.3 μm). By suppressing the change of F number due to image height, the curve of the scanning line can be brought Lastly, for the comparison with the scanning optical apparatus of the present invention, description will be made of the manner in which multibeam scanning was effected by a single beam scanning optical apparatus.

FIGS. 28A and 28B are cross-sectional views of the essential portions in the main scanning direction and the sub scanning direction, respectively, when multibeam scanning was effected by the use of the single beam scanning optical apparatus, and show the changes of the angular magnification in the sub scanning direction and the spot diameter (F number) in the sub scanning direction on the surface to be scanned, due to image height. Table 7 below shows the optical arrangement shown in FIGS. 28A and 28B and the aspherical surface coefficients of an fθ lens 86.

TABLE 7

| Design Data | | | shape of fθ lens | |
|---|---|---|---|---|
| | | | 1st surface | 2nd surface |
| wavelength used | λ(nm) | 780 | R | 6.7814E+01 | 1.6154E+02 |
| refractive index of fθ lens | n | 1.519 | K | −1.6787E+01 | −1.0814E+02 |
| angle of incidence on polygon | θi | −90 | B4 | −9.8604E−07 | −2.2909E−06 |
| maximum angle of emergence from polygon | θmax | 45 | B6 | 1.5479E−11 | 7.1426E−10 |
| polygon − fθ lens | e | 36 | B8 | 8.7055E−14 | −3.2030E−13 |
| center thickness of fθ lens | d | 11 | B10 | −4.7942E−18 | 7.9836E−17 |
| fθ lens − surface to be scanned | Sk | 110.5 | r | −2.8531E+01 | −1.1991E+01 |
| maximum effective diameter of fθ lens | Ymax | 42 | D2S | 0.0000E+00 | 2.1635E−05 |
| focal length of fθ lens | ft | 213.7 | D4S | 0.0000E+00 | −3.6548E−08 |
| degree of convergence of collimator | fc | 317.3 | D6S | 0.0000E+00 | 2.7926E−11 |
| polygon − natural converging point | | | D8S | 0.0000E+00 | −1.1184E−14 |
| polygon | circumscribed circle φ20 4 surfaces | | D10S | 0.0000E+00 | 1.7618E−18 |
| | | | D2E | 0.0000E+00 | 2.2817E−05 |
| | | | D4E | 0.0000E+00 | −3.8012E−08 |
| | | | D6E | 0.0000E+00 | 2.9368E−11 |
| | | | D8E | 0.0000E+00 | −1.2060E−14 |
| | | | D10E | 0.0000E+00 | 1.9700E−18 |

In FIGS. 28A and 28B, two in dependently modulated divergent beams of light emitted from light source means 81 are converted into convergent beams of light by a collimator lens 82, and these beams of light (the quantity of light) are limited by a stop 83 and enter a cylindrical lens 84 having predetermined refractive power. The beams of light having entered the cylindrical lens 84, in the main scanning plane, intactly emerge in that state. Also, in the sub scanning section, they converge and are imaged as substantially linear images on the deflecting surface (reflecting surface) 85a of a light deflector 85 comprising a rotatable polygon mirror. The two beams of light deflected and reflected by the deflecting surface 85a of the light deflector 85 are directed onto a photosensitive drum surface as a surface 88 to be scanned through an imaging optical system (fθ lens) 86 having the fθ characteristic, and the light deflector 85 is rotated in the direction of arrow A, whereby the photosensitive drum surface 88 is light-scanned to thereby effect the recording of image information.

Usually, in a plane inclination correcting optical system, as previously described, it is necessary to bring the deflecting surface of the light deflector and the surface to be scanned into optically conjugate relationship (imaging relationship) with each other in order to optically correct the plane inclination of the deflecting surface. In the comparative example shown in FIGS. 28A and 28B, with the curvature in the sub scanning direction (meridian line curvature) of that lens surface (first surface) R1 of the fθ lens 86 which is adjacent to the light deflector 85 being constant, the curvature in the sub scanning direction (meridian line curvature) of that lens surface (second surface) R2 of the fθ lens 86 which is adjacent to the surface to be scanned is continuously varied from the on-axis toward the off-axis to thereby bring about conjugate relationship at any image height.

Figure 29:
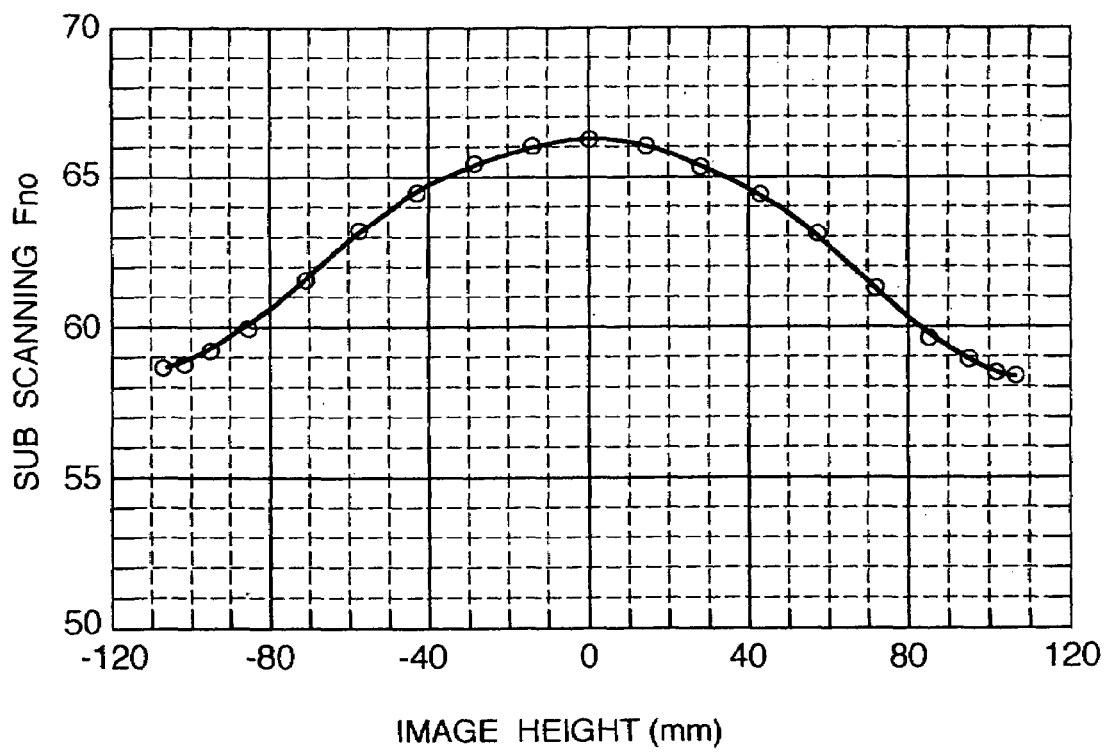
FIG. 29 is an illustration showing a change of F number in the sub scanning direction on a surface to be scanned relative to image height in the single beam scanning optical apparatus shown in FIGS. 28A and 28B.
Figure 30:
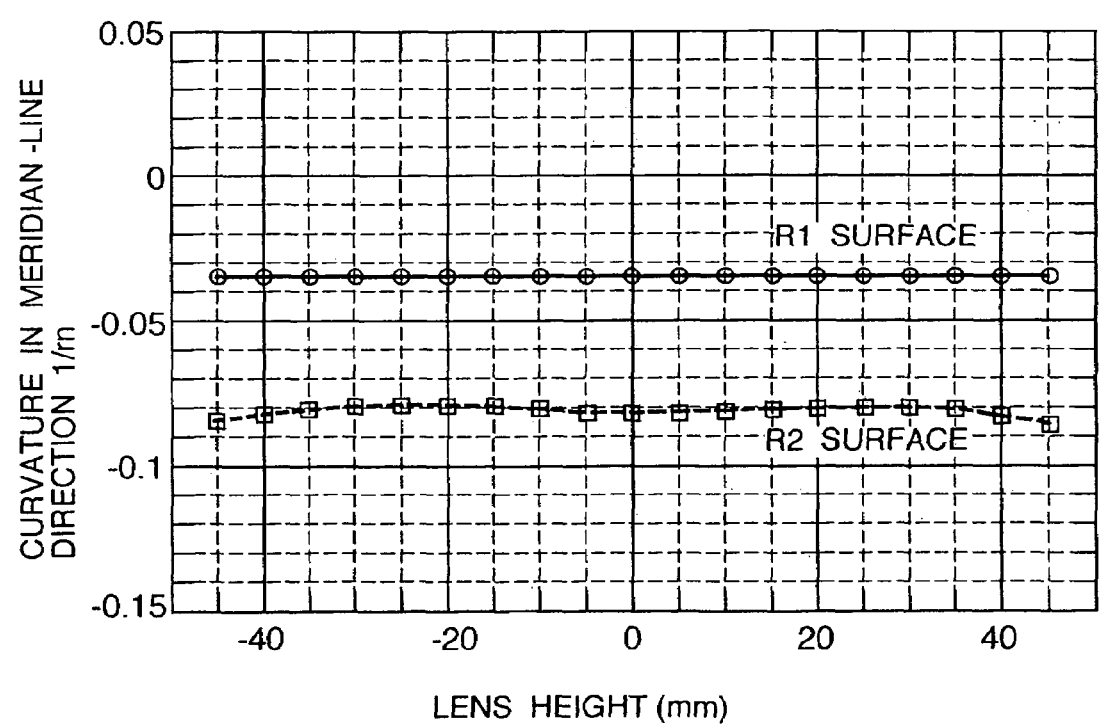
FIG. 30 is an illustration showing the curvature of an fθ lens in the meridian-line direction relative to image height in the single beam scanning optical apparatus shown in FIGS. 28A and 28B.

However, the fθ lens 86 in the above-described comparative example is constant in the meridian line curvature of one surface (surface R1) thereof as shown in FIG. 30 and therefore, as shown in FIG. 29, depending on the bus line shape thereof, F number (F No) becomes irregular due to image height. That is, on the axis (the on-axis beam), the F number in the sub scanning direction on the surface to be scanned is great as shown in (1) in FIG. 28B and therefore, the angular magnification in the sub scanning direction is small, and off the axis (the off-axis beam), the F number in the sub scanning direction is small as shown in (2) in FIG. 28B and therefore, the angular magnification is great (there is a converse case depending on the main scanning plane shape).

Generally, between the angular magnification γ and the lateral magnification β, the relation that $$\beta\gamma=-1$$

is established and therefore, in the above-described comparative example, the lateral magnification becomes great on the axis and the lateral magnification becomes small off the axis. Therefore, due to image height, irregularity is created in the lateral magnification in the sub scanning direction, and in an optical system like a multibeam scanning optical apparatus which uses a plurality of laser beams off the optical axis to scan, the scanning line makes a curve on the surface to be scanned.

Figure 31:
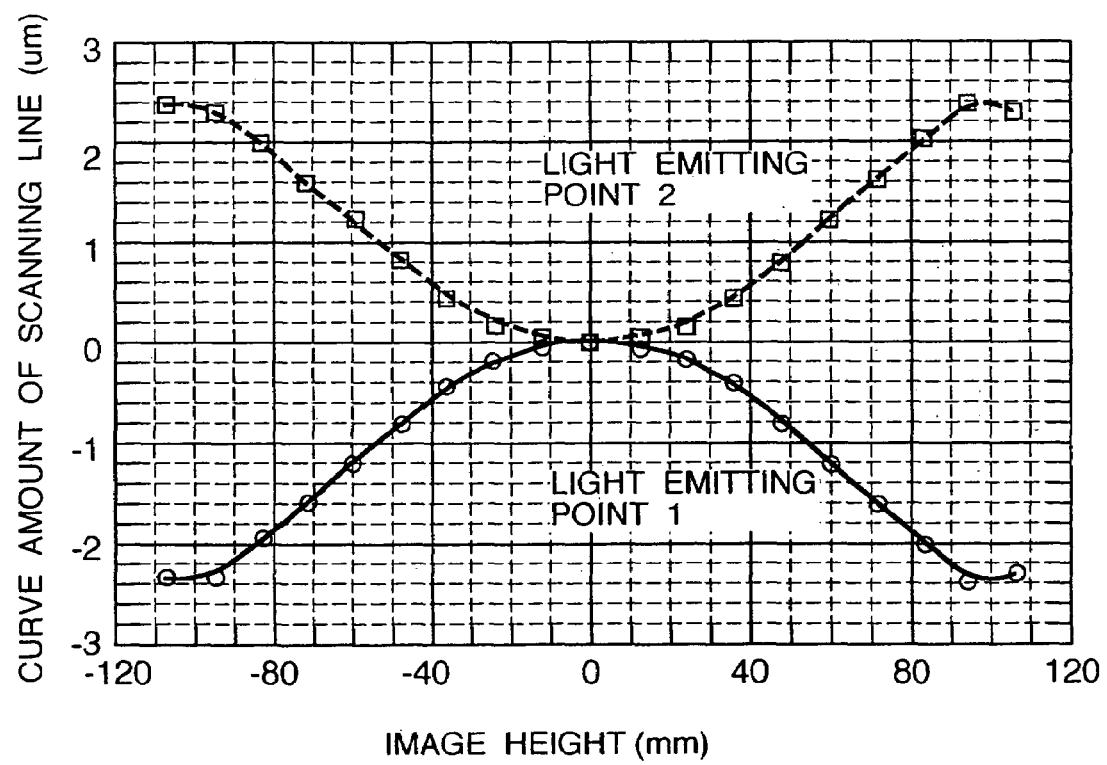
FIG. 31 is an illustration showing the curve of a scanning line during multibeam scanning at resolution 600 dpi (scanning line interval 42.3 μm) in the single beam scanning optical apparatus shown in FIGS. 28A and 28B.

FIG. 31 is an illustration showing the curve of the scanning line when the multibeam scanning optical apparatus of the comparative example is used at resolution 600 dpi (scanning line interval 42.3 μm). In FIG. 31, the scanning line in the marginal portion is curved by 2.4 μm with respect to the central portion, and this leads to the problem that pitch irregularity of 4.8 μm will result and deteriorate the quality of image.

The above-noted problem does not arise in the scanning optical apparatus of the present invention, and according to a first invention, there can be achieved a compact scanning optical apparatus suitable for highly accurate printing in which when as previously described, a beam of light from a light source converted by a collimator lens or the like is to be imaged on a surface to be scanned by an fθ lens through a light deflector, curvature of image field, distortion, etc. are well corrected by optimizing the lens shape of the fθ lens and the non-uniformity of the lateral magnification in the sub scanning direction between the light deflector and the surface to be scanned can be eliminated to thereby suppress the change of F number in the sub scanning direction due to image height, i.e., the change of the spot diameter.

Also, according to a second invention, there can be achieved a multibeam scanning optical apparatus in which when as previously described, a plurality of beams of light from a light source converted by a collimator lens or the like are to be imaged on a surface to be scanned by an fθ lens through a light deflector, curvature of image field, distortion, etc. are well corrected by optimizing the lens shape of the fθ lens and the non-uniformity of the lateral magnification in the sub scanning direction between the light deflector and the surface to be scanned can be eliminated to thereby suppress the change of F number in the sub scanning direction due to image height, i.e., the change of the spot diameter, and reduce the pitch irregularity due to the curve of the scanning line.

Further, there can be achieved a multibeam scanning optical apparatus in which the curvature of the fθ lens in the sub scanning direction is determined so as to satisfy the aforementioned conditional expression (2), whereby pitch irregularity can be reduced to a visually problem-free level.

What is claimed is:

1. In an optical scanner having a source of a light beam, a deflector for deflecting said light beam and an imaging lens that focuses the deflected light beam to form a beam spot on a surface to be scanned, the improvement wherein the curvatures in a sub-scanning direction of two of the surfaces of said imaging lens vary continuously along a main scanning direction over the effective area of said imaging lens and independently of the curvatures in the main scanning direction, and wherein the curvatures in the main and sub-scanning directions are rotationally non-symmetrical with respect to the optical axis.

2. An optical scanner according to claim 1, wherein the optical magnification of said imaging lens in the sub-scanning direction is constant over the effective scanning region.

3. An optical scanner according to claim 2, wherein said imaging lens is a single lens.

4. An optical scanner according to claim 3, wherein said imaging lens satisfies the following requirement:
the entrance face of said imaging lens has a cross section taken in the sub-scanning direction which is concave at the center of scanning and convex at either end of scanning.

5. An optical scanner according to claim 4, wherein said imaging lens has a surface that is aspheric in the main scanning direction.

6. An optical scanner according to claim 5, wherein said imaging lens has a surface having a point of inflection in the main scanning direction.

7. An optical scanner according to claim 5, wherein said light source has a plurality of light-emitting portions.

8. An optical scanner according to claim 7, wherein that element of the imaging lens which has such a surface that the curvature in the sub-scanning direction varies continuously along the main scanning direction over the effective area of said imaging lens is made of plastic.

9. An optical scanner according to claim 1, wherein said imaging lens is a single lens.

10. An optical scanner according to claim 9, wherein said imaging lens satisfies the following requirement:
the entrance face of said imaging lens has a cross section taken in the sub-scanning direction which is concave at the center of scanning and convex at either end of scanning.

11. An optical scanner according to claim 10, wherein said imaging lens has a surface that is aspheric in the main scanning direction.

12. An optical scanner according to claim 11, wherein said imaging lens has a surface having a point of inflection in the main scanning direction.

13. An optical scanner according to claim 11, wherein said light source has a plurality of light-emitting portions.

14. An optical scanner according to claim 13, wherein that element of the imaging lens which has such a surface that the curvature in the sub-scanning direction varies continuously along the main scanning direction over the effective area of said imaging lens is made of plastic.

15. An optical scanner according to claim 14, wherein said imaging lens has a surface that is aspheric in the main scanning direction.

16. An optical scanner according to claim 15, wherein said imaging lens has a surface having a point of inflection in the main scanning direction.

17. An optical scanner according to claim 15, wherein said light source has a plurality of light-emitting portions.

18. An optical scanner according to claim 17, wherein that element of the imaging lens which has such a surface that the curvature in the sub-scanning direction varies continuously along the main scanning direction over the effective area of said imaging lens is made of plastic.

19. In an optical scanner having a source of a light beam, a deflector for deflecting the light beam and an imaging lens system for focusing the light beam deflected by said deflector to form a beam spot on a surface to be scanned, the improvement wherein curvatures in a sub-scanning direction of two surfaces of said imaging lens system vary continuously along a main scanning direction over an effective area of said imaging lens system and independently of curvatures in the main scanning direction, and wherein the curvatures in the main and sub-scanning directions are rotationally non-symmetrical with respect to an optical axis of said imaging lens system.

20. In an optical scanner having a source of a light beam, a deflector for deflecting the light beam and an imaging lens system for focusing the light beam deflected by said deflector to form a beam spot on a surface to be scanned, the improvement wherein said imaging lens system comprises a plurality of surfaces having curvatures in a sub-scanning direction which vary continuously along a main scanning direction over an effective area of said imaging lens system and independently of curvatures in the main scanning direction, and wherein the curvatures in the main and sub-scanning directions are rotationally non-symmetrical with respect to an optical axis of said imaging lens system.

21. In an optical scanner having a source of a light beam, a deflector for deflecting the light beam and an imaging lens system for focusing the light beam deflected by said deflector to form a beam spot on a surface to be scanned, the improvement wherein said imaging lens system comprises a plurality of surfaces having curvatures in a sub-scanning direction which vary continuously along a main scanning direction over an effective area of said imaging lens system and independently of curvatures in the main scanning direction to provide a substantially constant optical magnification in the sub-scanning direction over the effective scanning region, and wherein the curvatures in the main and sub-scanning directions are rotationally non-symmetrical with respect to an optical axis of said imaging lens system.

22. In an optical scanner having a source of a light beam, a rotatable polygonal mirror for deflecting the light beam and an imaging lens system for focusing the light beam deflected by said polygonal mirror to form a beam spot on a surface to be scanned, wherein the light beam is incident on the polygonal mirror in a direction inclined relative to an optical axis of said imaging lens system in the main scanning plane, the improvement wherein said imaging lens system comprises a plurality of surfaces having curvatures in a sub-scanning direction which vary continuously along a main scanning direction over an effective area of said imaging lens system and independently of curvatures in the main scanning direction, and wherein the curvatures in the sub-scanning direction are non-symmetrical with respect to a sub-scanning plane including the optical axis, and wherein the curvatures in the main and sub-scanning directions are rotationally non-symmetrical with respect to an optical axis of said imaging lens system.

23. An optical scanner according to any one of claims 19, 20, 21 and 22, wherein the optical magnification of said imaging lens system in the sub-scanning direction is constant over the effective scanning region.

24. An optical scanner according to any one of claims 19, 20, 21, and 22, wherein said imaging lens system has only one lens.

25. An optical scanner according to claim 24, wherein said imaging lens system satisfies the following requirement:

an entrance face of said imaging lens has a cross section taken in the sub-scanning direction which is concave at the center of the scanning region and convex at either end of the scanning direction.

26. An optical scanner according to any one of claims 19, 20, 21, and 22, wherein said imaging lens system has a surface that is aspheric in the main scanning direction.

27. An optical scanner according to claim 26, wherein said imaging lens system has a surface having a point of inflection in the main scanning direction.

28. An optical scanner according to any one of claims 19, 20, 21, and 22, wherein that element of the imaging lens which has such a surface that the curvature in the sub-scanning direction varies continuously along a main scanning direction over an effective area of said imaging lens system is made of plastic.

29. In an optical scanner having a source of a light beam, a deflector for deflecting said light beam and an imaging lens that focuses the deflected light beam to form a beam spot on a surface to be scanned, the improvement wherein the curvatures in a sub-scanning direction of two of the surfaces of said imaging lens can be defined as functions of variables not including curvatures in a main scanning direction over the effective area of said imaging lens, and wherein the curvatures in the main and sub-scanning directions are rotationally non-symmetrical with respect to the optical axis.

* * * * *